US006930984B1

(12) United States Patent
Nomura et al.

(10) Patent No.: US 6,930,984 B1
(45) Date of Patent: Aug. 16, 2005

(54) NETWORK-DEVICE CONTROL SYSTEM AND APPARATUS

(75) Inventors: Yuji Nomura, Kawasaki (JP);
Yoshitoshi Kurose, Kawasaki (JP);
Shinya Kano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/468,143

(22) Filed: Dec. 21, 1999

(30) Foreign Application Priority Data

Jan. 14, 1999 (JP) .................................. 11-007129

(51) Int. Cl.$^7$ ........................................... H04L 12/28
(52) U.S. Cl. ..................................... 370/254; 370/351
(58) Field of Search ................. 370/230, 235, 370/351, 352, 356, 389, 400, 401, 373, 374, 370/377, 381, 383, 384, 395.42, 254, 237, 370/238, 236, 236.1, 236.7; 709/103; 725/14, 725/46

(56) References Cited

U.S. PATENT DOCUMENTS

| | | | | |
|---|---|---|---|---|
| 5,463,735 A | * | 10/1995 | Pascucci et al. ............. | 709/222 |
| 5,627,886 A | * | 5/1997 | Bowman ...................... | 379/111 |
| 5,805,816 A | * | 9/1998 | Picazo et al. ................ | 709/223 |
| 5,828,882 A | * | 10/1998 | Hinckley .................... | 709/318 |
| 5,893,077 A | * | 4/1999 | Griffin ........................ | 705/34 |
| 5,907,602 A | * | 5/1999 | Peel et al. .............. | 379/114.14 |
| 5,991,881 A | * | 11/1999 | Conklin et al. .............. | 713/201 |
| 6,052,720 A | * | 4/2000 | Traversat et al. ............ | 709/220 |
| 6,061,334 A | * | 5/2000 | Berlovitch et al. .......... | 370/255 |
| 6,118,768 A | * | 9/2000 | Bhatia et al. ................ | 370/254 |
| 6,119,157 A | * | 9/2000 | Traversat et al. ............ | 709/220 |
| 6,139,177 A | * | 10/2000 | Venkatraman et al. ........ | 700/83 |
| 6,161,125 A | * | 12/2000 | Traversat et al. ............ | 709/203 |
| 6,167,445 A | * | 12/2000 | Gai et al. .................... | 709/223 |
| 6,185,613 B1 | * | 2/2001 | Lawson et al. ............. | 709/224 |
| 6,292,465 B1 | * | 9/2001 | Vaid et al. .................. | 370/230 |
| 6,418,324 B1 | * | 7/2002 | Doviak et al. .............. | 455/556 |
| 6,484,200 B1 | * | 11/2002 | Angal et al. ................ | 709/224 |

(Continued)

FOREIGN PATENT DOCUMENTS

JP 9-331359 12/1997

(Continued)

OTHER PUBLICATIONS

1999 IEEE International Conference on Communications, Jun. 6-10, 1999, Vancouver, British Columbia, Canada.*

(Continued)

*Primary Examiner*—Wellington Chin
*Assistant Examiner*—Jamal A. Fox
(74) *Attorney, Agent, or Firm*—Katten Muchin Zavis Rosenman

(57) ABSTRACT

In a network-device control system for controlling a network device such as a router, which is located between a communication terminal employed by a user and a server with which the terminal communicates, at a priority that has been set in advance for the user or for an application, an event notification device detects that a user has logged in to the communication terminal or that the user has launched a predetermined application from the communication terminal and reports the user identifier or the application identifier to a network-device controller. The latter acquires user priority or application priority on the basis of the reported identifier and, in accordance with the priority, controls the router on the communication path between the communication terminal and the server.

17 Claims, 19 Drawing Sheets

U.S. PATENT DOCUMENTS

| | | | | |
|---|---|---|---|---|
| 6,502,131 B1 * | 12/2002 | Vaid et al. | ................... | 709/224 |
| 6,578,077 B1 * | 6/2003 | Rakoshitz et al. | ........... | 709/224 |
| 6,584,502 B1 * | 6/2003 | Natarajan et al. | ............ | 709/224 |
| 6,587,127 B1 * | 7/2003 | Leeke et al. | ................. | 715/765 |
| 6,633,910 B1 * | 10/2003 | Rajan et al. | ................. | 709/224 |

FOREIGN PATENT DOCUMENTS

| | | | | |
|---|---|---|---|---|
| JP | 09-331359 | * 12/1997 | ........... | H04L 12/66 |
| JP | 11-122296 | * 4/1999 | ........... | H04L 12/56 |

OTHER PUBLICATIONS

Technical Report of the Institute of Electronics, Information and Communication Engineers Jan. 22, 1999.

1999 IEEE International Conference on Communications Jun. 6-10, 1999 Vancouver, British Columbia, Canada.

The COPS (Common Open Policy Service) protocol Author: Jim Boyle et al. Nov. 1998 Name of Document: Internet Draft.

COPS Usage for Differentiated Services Author: Francis Reichmeyer et al, Dec. 1998 Name of Document: Internet Draft.

A Framwork for Policy-Based Admission Control Author: Raj Yavatkar Nov. 21, 1997 Name of Document: Internet Draft.

Implementing Policy in Enterprise Networks Author: Lundy Lewis Jan. 1996 Name of Document: IEEE Communications Magazines.

Chaudhury, et al., "Directory Schema for Service Level Administration of Differentiated Services in Networks" Draft V02, Directory Enable Networks—Ad Hoc Working Group Jun. 20, 1998, pp. 1-20; XP002254842.

Krishnamurthy, et al., "Yeast: a General Purpose Event-Action System" IEEE Transactions on Software Engineering, vol. 21, No. 10 Oct. 1995, pp. 845-857, XP002932236.

Judd, et al., "Directory-Enabled Networks—Information Model and Base Schema" Draft V3. OC5 Directory-Enabled Networks—Ad Hoc Working Group; Aug. 29, 1998: pp. 1-114; XP002254843.

Lakshman, et al., "Integrated CPU and Network—I/O QoS Management in an Endsystem" Computer Communications, Elsevier Science Publishers BV vol. 21, No. 4; Apr. 10, 1998: pp. 325-333: XP004115275 ISBN: 0140-3664.

Nomoto, et al., Augmented Trigger Mechanisms for Groupwork Enviorment Proceedings of Information Networking Jan. 1998, pp. 568-573: XP002932237.

* cited by examiner

| OWN NODE ADDRESS | ADJACENT NODE ADDRESS |
|---|---|
| 192.168.15.1/24 A | 192.168.10.1/24 B |
|  | 192.168.20.1/24 C |
|  | 192.168.21.1/24 D |

| OWN NODE ADDRESS | ADJACENT NODE ADDRESS |
|---|---|
| 192.168.10.1/24 B | 192.168.15.1/24 A |
|  | 192.168.11.1/24 E |

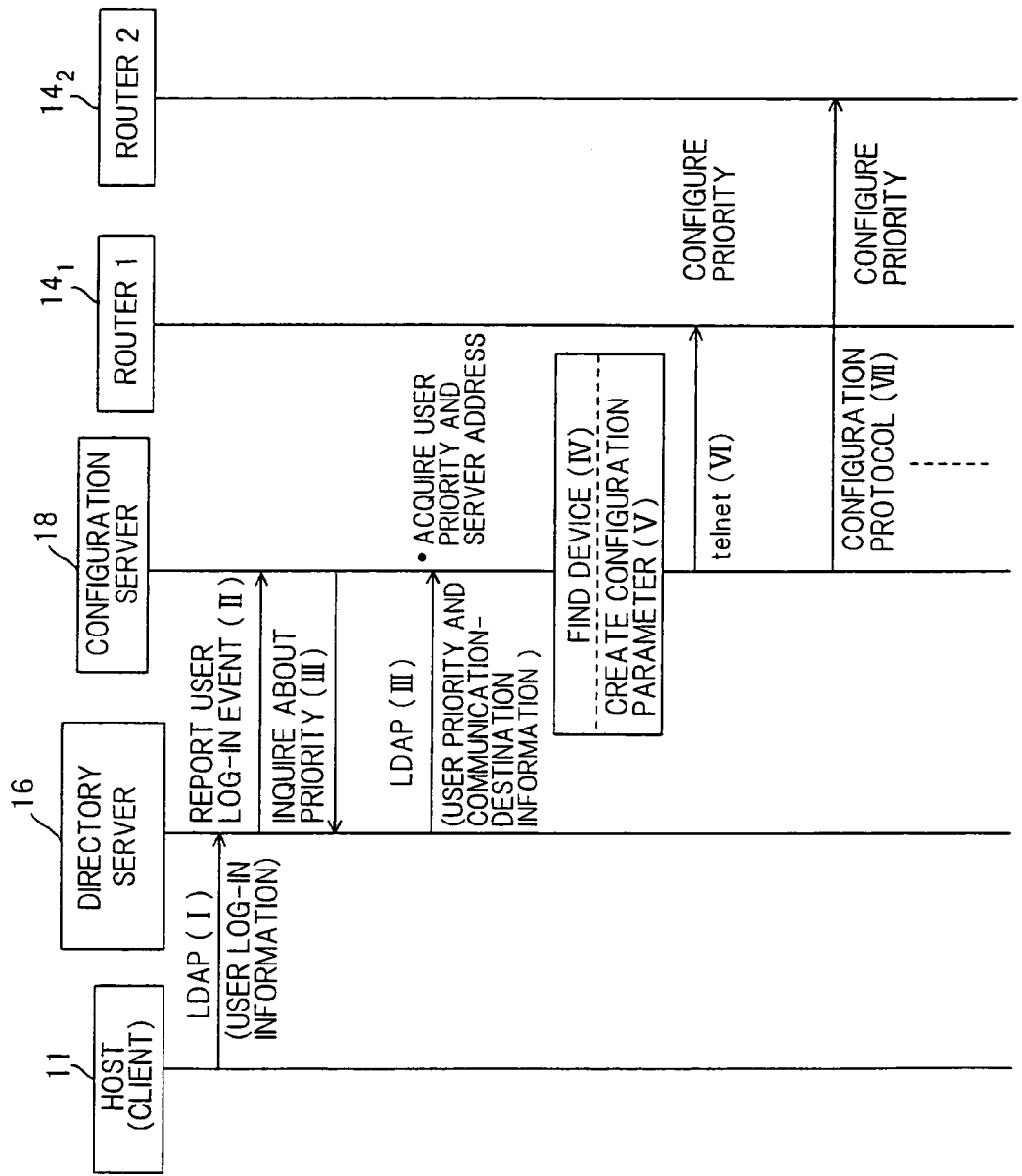

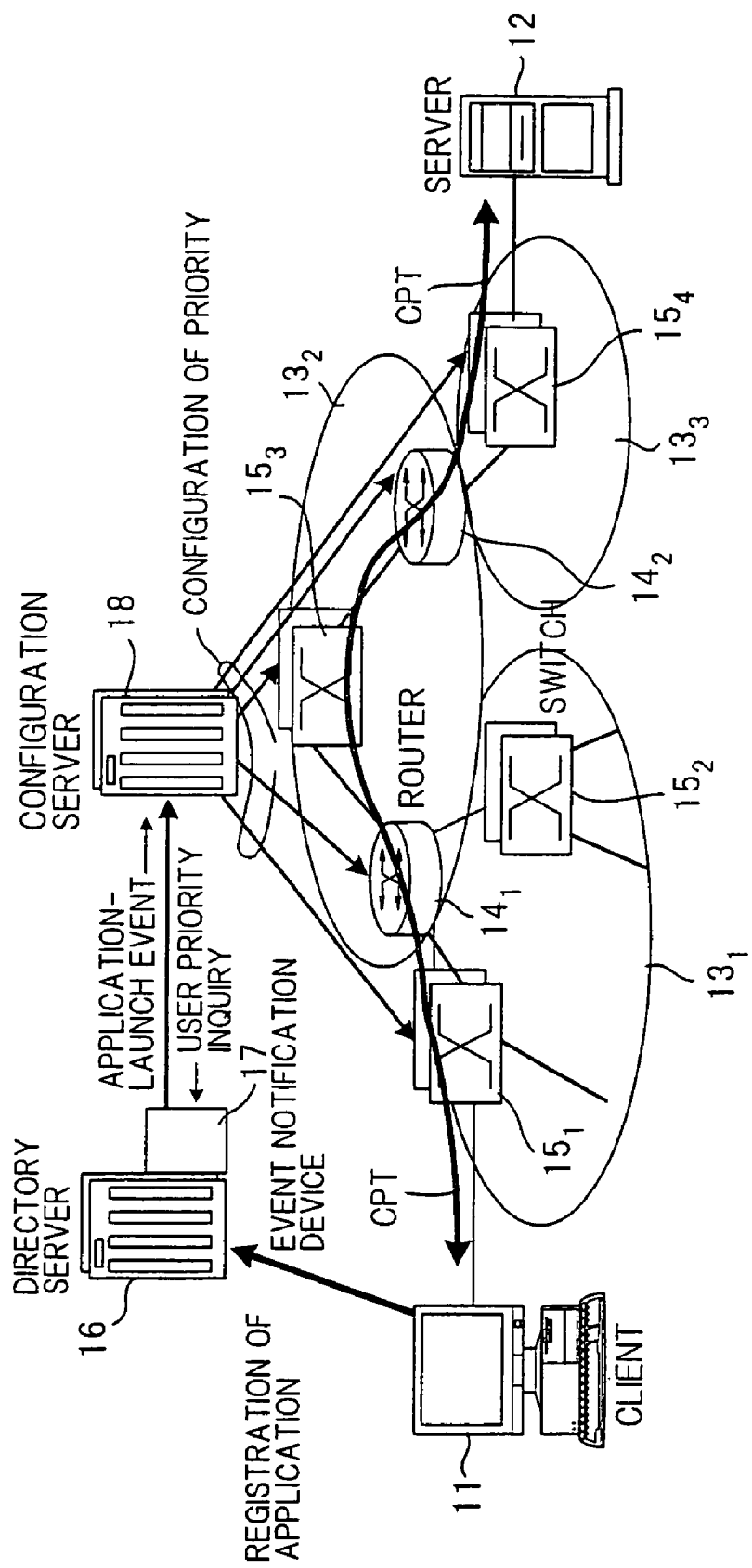

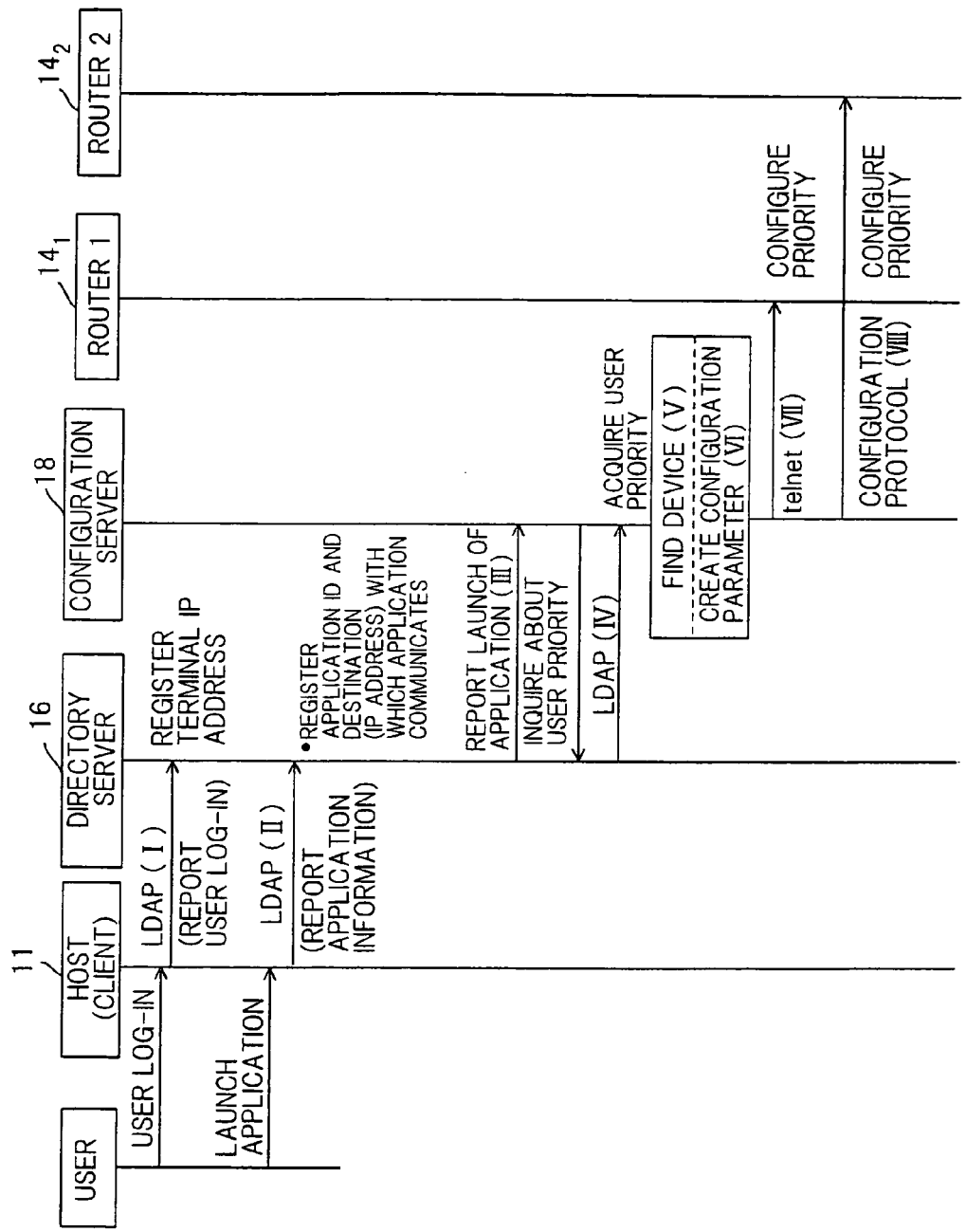

NETWORK-DEVICE CONTROL SYSTEM AND APPARATUS

BACKGROUND OF THE INVENTION

This invention relates to a system and apparatus for controlling network devices. More particularly, the invention relates to a network-device control system and apparatus for performing control of priority, bandwidth, discard rate and delay in relation the devices that construct a network.

The following functions and features (1) to (3) are currently sought as network requirements:

(1) Quality Assurance

Unification of continuous traffic, such as telephone traffic that is sensitive to delay, and basic business traffic with an IP (Internet Protocol) network of superior cost performance is sought. However, the basic nature of an IP network is best-effort transport of IP packets. In such a best-effort transport environment, an effort is made only to transport arriving packets to the next stage without distinguishing among users or among applications. Packets that cannot be transported (i.e., packets for which buffer overflow has occurred) are discarded as is. Accordingly, in order for a best-effort IP network to accommodate delay-sensitive traffic, it is required that control of traffic priority and assurance of bandwidth based upon the user or application is introduced in an IP network.

(2) Minimum Modification of Existing Network Devices

Replacing terminal devices and network devices (routers, switches, etc.) and installing new software in these devices in order to assure bandwidth and control priority on a network raises the cost of introduction and, hence, is a hindrance to such introduction. Minimizing the modification of existing devices is required in order to solve this problem.

(3) Quality and Priority Control Capable of Dealing with Dynamic Modification of Terminal Devices and Network Devices Among all devices that construct a network, it will suffice to apply quality and priority control solely to end-to-end devices on the communication path. This communication path is decided in accordance with a predetermined routing protocol based upon the destination address with which communication is performed and the terminal address of the accessing party. However, the destination address and terminal address change constantly depending upon the location of the user and the application utilized. A dynamic quality and priority control method that can deal with such change is sought.

The following two methods have been contemplated for the purpose of performing quality assurance control such as control for assurance of bandwidth or control of priority.

The first method involves statically configuring network devices for the purpose of quality-assurance control. Specifically, control of communication quality with respect to terminal-to-terminal communication is performed by configuring the network devices before hand so that predetermined bandwidth assurance and priority control is attained. This is the most widely utilized approach at present. In order to configure for bandwidth assurance and priority control (i.e., in order to establish control of quality), there are two methods, namely (a) a method referred to as limited configuration method which includes predicting communication that will occur and configuring network devices on this communication path for control of quality in limited fashion, and (b) a method which includes configuring all configurable network devices for control of quality comprehensively without particularly specifying a path.

The second method uses an RSVP (Resource Reservation Protocol) for which control of quality can be configured dynamically. RSVP is a control protocol for reserving resources in the IP layer. According to RSVP, control messages are exchanged between routers that support RSVP and the sender and receiver. The RSVP works to reserve transmission paths and memory resources within an apparatus so that an application can be executed. FIG. 20 is a diagram useful in describing RSVP. A sender 1 sends a receiver 2 a path message that describes the traffic characteristics of the information (content) to be transmitted. The path message is distributed to the receiver 2 by being transferred along a path (routers 3, 4) set up by a predetermined routing protocol. The receiver 2 refers to the content described in the path message and sends a reserve message, which describes the resources requiring reservation, back to the sender 1. If reservation requests from a plurality of receivers are merged and acceptance of a requested bandwidth reservation is possible in a router along the path, bandwidth is secured in accordance with the content of the reservation request and a reserve message is transferred to a router upstream and to the sender 1. If acceptance of a requested bandwidth reservation is impossible, however, the reserve message is discarded and an error message is transmitted to the receiver 1.

The second method based upon RSVP described above makes it possible to control quality dynamically when the user so desires.

However, the first and second methods set forth above do not always satisfy the above-mentioned requirements (1), (2) and (3).

If communication different from that predicted in advance takes place, as when a user makes access from a terminal different from that configured beforehand or when a network device is added on anew, the limited configuration technique according to the first method is such that static quality-control settings will not exist for such communication. This means that the required control of quality cannot be performed. In other words, with the limited configuration method, changes in conditions cannot be dealt with and, as a result, control of quality cannot be realized.

With the other technique available in accordance with the first method, namely the technique through which all configurable network devices are configured for quality control, the user can make access from any terminal whatsoever because all of the terminals will have been configured. However, since settings that support all communication patterns are required for all network devices, the storage area necessary in a network device for the purpose of storing these settings is enormous. (The size of the storage area is proportional to the square of the number of terminals.) Since a network device possesses only a limited storage area, such comprehensive configuring of network devices is difficult. The result is that network communication assumed beforehand undergoes limited configuration.

With the second method, it is assumed that both sending and receive terminals involved in communication and all network devices (routers) on the path along which this communication takes place support RSVP. Consequently, if a network device that does not support RSVP exists in the network, this device cannot undergo any control of quality. If congestion occurs in regard to this network device, even a packet in communication requiring control of quality will be discarded or delayed. The end result is that communication quality cannot be controlled. In order to avoid this problem, components which support RSVP are required for all network devices and it is necessary to increase the storage area and processing capability of each network device.

SUMMARY OF THE INVENTION

Accordingly, an object of the present invention is to arrange it so that priority control and quality control (control of bandwidth, discard rate and delay) can be carried out even if there is a change in a terminal employed by a user or a change in network configuration due to the addition of a network device.

Another object of the present invention is to arrange it so that priority control and quality control can be performed, without dependence upon a specific protocol such as RSVP, even if there is a change in a terminal employed by a user or a change in network configuration due to the addition of a network device.

Another object of the present invention is to arrange it so that communication can be performed between a terminal employed by a user and a server, which is the destination of communication, at a priority or quality set for the user in advance.

A further object of the present invention is to arrange it so that communication can be performed between a user terminal that has launched an application and a server, which is the destination of communication, at a priority or quality set for the application in advance.

(a) First Network-Device Control System of the Present Invention

A first network-device control system according to the present invention includes (1) an event notification device for detecting that a user has logged in to a communication terminal or that a user has launched a predetermined application from a communication terminal, and giving notification of an identifier of the user and of the fact that an event has occurred, and (2) a network-device controller for performing priority control of a network device based upon information of which notification has been given by the event notification device. The network-device controller acquires the priority of the user indicated by the user identifier of which notification has been given by the event notification device, obtains a network device on a communication path between the communication terminal employed by the user and a server which is the destination of communication, generates information necessary to perform priority control in accordance with user priority, and sets this priority control information in each network device (routers, etc.) on the communication path.

In the first network-device control system described above, the event notification device includes (1) an event detector for detecting that a user has logged in to a communication terminal or that a user has launched an application from a communication terminal, and (2) an event notifier for notifying the network-device controller at least of the fact that the event occurred and of the user identifier. Further, the network-device controller includes (1) an event receiver for receiving notification from the event notifier, (2) a priority acquisition unit for acquiring the priority of a user indicated by a received user identifier, (3) a device selector for selecting a network device which is subjected to priority control based upon the priority of the user, (4) a device-specific information acquisition unit for acquiring state of configuration of the network device and a method of configuring the device, (5) a configuration information generator for generating priority-control configuration information for performing priority control of each network device based upon the acquired device-specific information and user priority, and (6) a configuration information transmitter for transmitting the priority-control configuration information, which has been generated by the configuration information generator, to the selected network device to thereby set the information in this network device.

In accordance with the first aspect of the invention, a network device is obtained on a communication path connecting a communication terminal employed by a user and a server that is the destination of communication, and priority control is performed upon setting priority information, which conforms to the priority of the user, in this device. As a result, control of priority can be performed dynamically, without using a specific protocol such as RSVP, even if there is a change in a terminal used by a user or a change in network configuration, such as a change due to the addition of a network device. Further, in accordance with the first aspect of the invention, communication between a terminal employed by a user and a server that is the destination of communication can be performed at a priority set for the user in advance. As a result, by setting a priority that takes the section/department to which an employee belongs and organization into account in an enterprise network, it is possible to perform communication based upon priority control commensurate with the set priority.

Further, according to the first aspect of the invention, there is provided a database unit for storing, in association with a user identifier, user information that includes the address of the server that is the destination of communication and the user priority. The event notification device acquires user priority and the server address from the database unit and reports these to the network-device controller. If this arrangement is adopted, the user, merely by entering the user identifier from a communication terminal and logging in, establishes a communication path between this communication terminal and the server with which the user wishes to communicate. Communication between the terminal employed by the user and the server can be performed at the priority set for the user beforehand.

Further, when an application is launched after user log-in, the priority control mentioned above can be carried out. If this arrangement is adopted, the configuring of priority control necessary for the user in a network is performed more accurately by taking launching of an application by the user as an event. When priority control is necessary, such control can be configured solely for the necessary network device.

(b) Second Network-Device Control System of the Present Invention

A second network-device control system according to the present invention includes (1) an event notification device for detecting that a user has launched a predetermined application from a communication terminal, and giving notification of an identifier of this application and of the fact that application-launch event has occurred, and (2) a network-device controller for performing priority control of a network device based upon information of which notification has been given. The network-device controller acquires the priority of the application indicated by the application identifier of which notification has been given by the event notification device, obtains a network device on a communication path between the communication terminal and a server with which the communication terminal communicates, generates information necessary to perform priority control in accordance with this priority, and configures each network device with this priority control information.

In the second network-device control system described above, the event notification device includes (1) an event detector for detecting that a communication terminal has given rise to an application-launch event, and (2) an event notifier for notifying the network-device controller at least of the fact that the event occurred and of the application identifier. Further, the network-device controller includes (1) an event receiver for receiving notification from the event notifier, (2) a priority acquisition unit for acquiring the priority of an application indicated by a received application identifier, (3) a device selector for selecting a network device which is subjected to priority control based upon the priority of the application, (4) a device-specific information acquisition unit for acquiring state of configuration of the selected network device and a method of configuring the device, (5) a configuration information generator for generating priority-control configuration information for performing priority control of each network device based upon the acquired device-specific information and application priority, and (6) a configuration information transmitter for transmitting the priority-control configuration information, which has been generated by the configuration information generator, to the selected network device to thereby set this information in this network device.

In accordance with the second aspect of the invention, a network device is obtained on a communication path connecting a communication terminal employed by a user and a server that is the destination of communication, and priority control is performed upon setting priority information, which conforms to the priority of the launched application, in this device. As a result, control of priority can be performed dynamically, without using a specific protocol such as RSVP, even there is a change in a terminal used by a user or a change in network configuration, such as a change due to the addition of a network device. As a result, by configuring priorities for various applications in an enterprise network upon taking into account the urgency and importance of these applications, it is possible to perform communication based upon priority control commensurate with the set priority.

Further, according to the second aspect of the invention, the event notification device acquires the priority of the application, the address of the server that is the destination of communication and the address of the communicating terminal from a database unit based upon the application identifier and reports these to the network-device controller. If this arrangement is adopted, the user, merely by entering the user identifier from a prescribed communication terminal, logging in and launching the prescribed application, can set up a communication path between this communication terminal and the server that conforms to the application. And communication between the terminal employed by the user and the server can be performed at the priority set for the application beforehand.

(c) Third Network-Device Control System of the Present Invention

In the first and second network-device control systems according to the present invention, priority is set in advance in conformity with the user or application and priority control is performed in accordance with the priority of the user or the priority of the application.

In the third network-device control system according to the present invention, a value of bandwidth, discard rate or delay time instead of priority is configured for a user or application and bandwidth control, discard-rate control or delay control is carried out in accordance with the configured value on a communication path between the terminal employed by the user and the communicating server. The configuration of the network-device control system in accordance with the third aspect of the present invention is substantially similar to that of the first and second aspects of the invention.

In accordance with the third aspect of the present invention, quality control can be performed dynamically, without using a particular protocol, even if there is a change in a terminal used by a user or a change in network configuration due to the addition of a network device. Further, the terminal employed by the user and the server that is the destination of communication can communicate at a quality set in advance for the user or application.

Other features and advantages of the present invention will be apparent from the following description taken in conjunction with the accompanying drawings.

BRIEF DESCRIPTION OF THE DRAWINGS

FIG. 7 is a diagram useful in describing a sequence according to a first embodiment of the present invention;

FIG. 8 is a diagram showing an example of the configuration of a network according to a second embodiment of the present invention;

FIG. 10 is a diagram useful in describing a sequence according to a second example of the present invention;

DESCRIPTION OF THE PREFERRED EMBODIMENTS

(A) Overview of the Present Invention

(a) Construction

Figure 1:
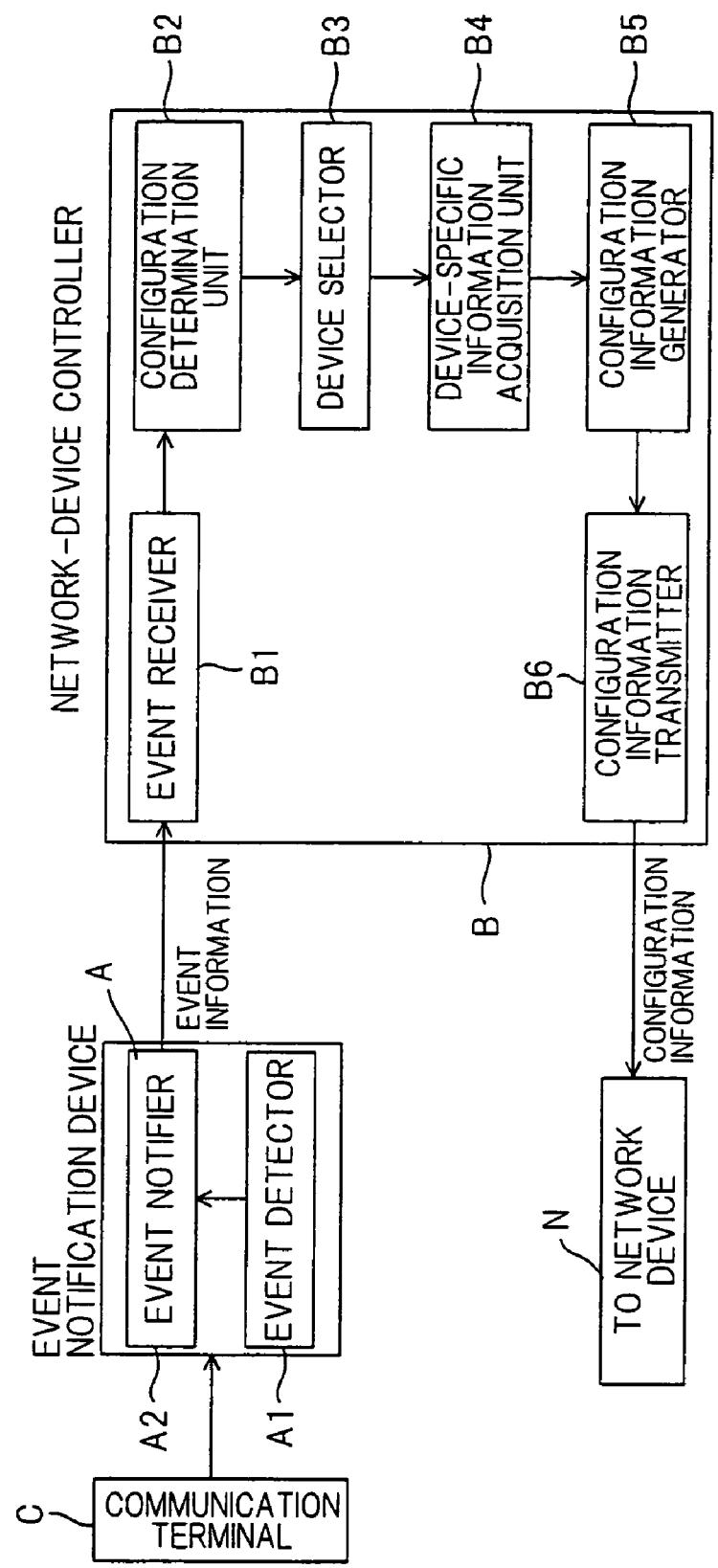
FIG. 1 is a block diagram useful in describing an overview of the present invention.

FIG. 1 is a block diagram illustrating an overview of the present invention.

In FIG. 1, an event notification device A detects and reports the fact that a user has logged in from a communication terminal C or that a user has launched a predetermined application on the communication terminal C. A network-device controller B performs priority control of a network device N based upon information reported from the event notification device A.

The event notification device A includes an event detector A1 for detecting that a user has logged in from the communication terminal C or that a user has launched an application from a communication terminal, and an event notifier A2 for notifying the network-device controller B of the fact that an event occurred, the identifier of the user or the identifier of the application.

The network-device controller B includes an event receiver B1 for receiving notification from the event notifier A2; a configuration determination unit B2 for acquiring the priority of a user indicated by a received user identifier or the priority of an application indicated by a received application identifier, and determining whether it is necessary to configure for priority control; a device selector B3 for selecting a network device which is subjected to priority control based upon the priority acquired; a device-specific information acquisition unit B4 for acquiring the configured state of a selected network device and a method of configuring the device; a configuration information generator B5 for generating priority-control configuration information necessary for performing priority control of every each network device based upon the acquired device-specific information and priority; and a configuration information transmitter B6 for transmitting the priority-control configuration information, which has been generated by the configuration information generator, to the selected network device N to thereby set this information in the network device.

(b) Overview of First Embodiment

The first embodiment is such that when a user logs in from a communication terminal, the network-device controller takes the log-in as an event to configure priority-control information for a network device on the communication path in accordance with a priority that has been set in advance for this user, thereby performing control of priority.

In a network having a device that records in memory the fact that a user has logged in from the communication terminal C, the event detector A1 reads the recorded content of the memory periodically and compares this with the previous recorded content to monitor a change in the recorded content, i.e., the occurrence of log-in. Alternatively, the event detector A1 monitors the occurrence of log-in by having the above-mentioned device notify it of the fact that the stored content has been updated.

Upon detecting log-in, the event detector A1 acquires the address of the communication terminal C, the identifier of the user who has logged in and the event type (log-in in this case), and the event notifier A2 reports the acquired information to the network-device controller B as event information.

In the network-device controller B, the event receiver B1 receives the event information from the event notification device A and delivers it to the configuration determination unit B2. The latter recognizes the fact that an event occurred at the communication terminal C and determines, based upon the type of event, whether configuring of priority control is required. If the configuring is required, the configuration determination unit B2 acquires information (user priority) that has been set in advance for the user and decides that traffic at such time that the user utilizes the network is to be controlled in accordance with the acquired priority. Next, the configuration determination unit B2 notifies the device selector B3 of the event information and of the fact that configuring of priority is necessary. The device selector B3 selects, among a number of network devices (routers, etc.) in the network, network devices on a communication path between the communication terminal C of the user and the server that is the destination of communication obtained from information that has been set in advance for this user. In other words, the network-device controller B selects network devices for which control of priority is required.

After the network devices have been selected, the device selector B3 adds address information of the devices for which the configuring of priority control is required onto the received information from the previous stage and delivers the resulting information to the device-specific information acquisition unit B4. The latter acquires, for each device indicated by the delivered device addresses, a method of configuring information for each device, configurable parameters and states of the devices, appends this information to the received information and delivers the resulting information to the configuration information generator B5. On the basis of the information received, the configuration information generator B5 determines what kind of configuration content is required for what network device and through what method, generates, by using the user priority, configuration content (priority-control configuration information) for all devices requiring configuring, and reports this information to the configuration information transmitter B6. On the basis of the priority-control configuration information and configuration method obtained from the configuration information generator B5, the configuration information transmitter B6 transmits the priority-control information to all network devices N on the communication path that need to be configured, thereby configuring these network devices.

According to the first embodiment, the event notification device A detects an event and, on the basis of the event, the network-device controller B dynamically configures the priority-control information for the network devices on the communication path. This makes possible flexible control of priority that accommodates a change in the state of a network. In addition, it is possible to perform communication control that conforms to the priority that has been set in advance for a user. Further, the protocol between a communication terminal (client), server and network device can be an already existing protocol. As a result, a network device or terminal need not be equipped with a special protocol in order to perform priority control.

(c) Overview of Second Embodiment

The second embodiment is such that when a user launches an application after logging in from a communication terminal, the network-device controller takes the launching of the application as an event to configure priority-control information for a network device on the communication path in accordance with a priority that has been set in advance for this user, thereby performing priority control. Therefore, unlike the first embodiment in which the configuring of priority-control information is performed by taking log-in as an event, the second embodiment configures priority-control information by taking launching of an application after log-in as the event.

The event detector A1 monitors the launching of applications in a manner similar to that of the first embodiment. Upon detecting launching of an application, the event detector A1 acquires the address of the communication terminal C that launched the application, the user identifier and the event type (launching of an application in this case), and the event notifier A2 reports the acquired information to the network-device controller B as event information.

In the network-device controller B, the event receiver B1 receives the event information from the event notification device A and delivers it to the configuration determination unit B2. As a result, the latter recognizes the fact that an event occurred at the communication terminal C and determines, based upon the type of event, whether configuring of priority control is required. If configuring is required, the configuration determination unit B2 acquires priority information that has been set in advance for the user and decides that traffic at such time that the application utilizes the network is to be controlled in accordance with the priority of the user. Next, the configuration determination unit B2 notifies the device selector B3 of the event information and of the fact that configuring of priority is necessary. Priority-control information is then configured for the network devices N on the communication path by control similar to that of the first embodiment.

According to the second embodiment, priority control is performed in accordance with a priority, which has been set in advance for the user, taking launching of an application after log-in as the event. In comparison with the first embodiment, therefore, configuring of priority control in accordance with user priority can be performed more reliably solely for network devices necessary for communication.

(d) Overview of Third Embodiment

The third embodiment is such that when a user launches an application after logging in from a communication terminal, the network-device controller takes the launching of the application as an event to configure priority-control information for a network device on the communication path in accordance with a priority that has been set in advance for this application, thereby performing priority control.

The event detector A1 monitors the launching of applications in a manner similar to that of the first embodiment. Upon detecting launching of an application, the event detector A1 acquires the address of the communication terminal C that launched the application, the application identifier and the event type (launching of an application in this case), and the event notifier A2 reports the acquired information to the network-device controller B as event information.

In the network-device controller B, the event receiver B1 receives the event information from the event notification device A and delivers it to the configuration determination unit B2. As a result, the latter recognizes the fact that an event occurred at the communication terminal C and determines, based upon the type of event, whether configuring of priority control is required. If configuring is required, the configuration determination unit B2 acquires information (priority) that has been set in advance for the launched application and decides that traffic at such time that the application utilizes the network is to be controlled in accordance with the above-mentioned priority. Next, the configuration determination unit B2 notifies the device selector B3 of the event information and of the fact that configuring of priority is necessary. The device selector B3 selects, among a number of network devices in the network, network devices on a communication path between the communication terminal C of the user and the server with which the application communicates. In other words, the network-device controller B selects network devices for which control of priority is required.

After the network devices have been selected, the device selector B3 adds address information of the devices for which the configuring of priority control is required onto the received information from the previous stage and delivers the resulting information to the device-specific information acquisition unit B4. The latter acquires, for each device indicated by the delivered device addresses, a method of configuring information for each device, configurable parameters and states of the devices, appends this information to the received information and delivers the resulting information to the configuration information generator B5. On the basis of the information received, the configuration information generator B5 determines what kind of configuration content is required for what network device and through what method, generates, by using the application priority, configuration content (priority-control configuration information) for all devices requiring configuration, and reports this information to the configuration information transmitter B6. On the basis of the priority-control configuration information and configuration method obtained from the configuration information generator B5, the configuration information transmitter B6 transmits the priority-control information to all network devices N that need to be configured, thereby configuring these network devices.

Thus, the configuring of priority-control information needed to execute an application can be performed only for devices requiring priority control, this being carried out taking launching of the application by the user as the event. Further, communication control conforming to a priority that has been set in advance for an application can be performed.

(e) Overview of Fourth Embodiment

The fourth embodiment is such that when a user launches an application after logging in from a communication terminal, the network-device controller takes the launching of the application as an event to configure bandwidth, which is required by the application, for a network device on the communication path of the application in accordance with a communication-quality value (e.g., bandwidth) that has been set in advance for this application, thereby performing bandwidth control of this network device.

The event detector A1 monitors the launching of applications in a manner similar to that of the first embodiment. Upon detecting launching of an application, the event detector A1 acquires the address of the communication terminal C that launched the application, the application identifier and the event type (launching of an application in this case), and the event notifier A2 reports the acquired information to the network-device controller B as event information.

In the network-device controller B, the event receiver B1 receives the event information from the event notification device A and delivers it to the configuration determination unit B2. The latter recognizes the fact that an event occurred at the communication terminal C and determines, based upon the type of event, whether configuring of bandwidth is required. If configuring is required, the configuration determination unit B2 acquires the communication-quality value (bandwidth information) of this application and decides that communication is to be performed upon reserving the bandwidth required by this application at the time of communication. Next, the configuration determination unit B2 notifies the device selector B3 of the event information and of the fact that configuring of bandwidth is necessary. The device selector B3 selects, among a number of network devices in the network, network devices on a communication path between the communication terminal C of the user and the server with which this application communicates. In other words, the network-device controller B selects network devices for which configuring of bandwidth is required.

After the network devices have been selected, the device selector B3 adds address information of the devices for which the configuring of bandwidth is required onto the received information from the previous stage and delivers the resulting information to the device-specific information acquisition unit B4. The latter acquires, for each device indicated by the delivered device addresses, a method of configuring information for each device, configurable parameters and states of the devices, appends this information to the received information from the previous stage and delivers the resulting information to the configuration information generator B5. On the basis of the information received, the configuration information generator B5 determines what kind of configuration content is required for what network device and through what method, generates configuration content (bandwidth-control information) for all devices for which bandwidth required by the application must be reserved, and reports this information to the configuration information transmitter B6. On the basis of the bandwidth-control information and configuration method obtained from the configuration information generator B5, the configuration information transmitter B6 transmits the bandwidth-control information to all network devices N that need to be configured, thereby configuring these network devices.

The foregoing is for a case where bandwidth required by an application is configured as a communication-quality value. However, discard rate and delay time, etc., can also be configured in conformity with the application.

In accordance with the fourth embodiment, the configuring of quality control such as bandwidth, discard rate and delay needed for an application can be performed in a network only for devices requiring configuring, this being carried out taking launching of the application by the user as the event.

(f) Overview of Fifth Embodiment

The fifth embodiment is such that when a user logs in from a communication terminal, the network-device controller takes log-in as an event to configure bandwidth required by a user for a network device on the communication path in accordance with a communication-quality value (e.g., bandwidth) that has been set in advance for this user, thereby performing bandwidth control of this network device.

The event detector A1 monitors log-in in a manner similar to that of the first embodiment. Upon detecting log-in, the event detector A1 acquires the address of the communication terminal C, the identifier of the user who logged in and the event type (log-in in this case), and the event notifier A2 reports the acquired information to the network-device controller B as event information.

In the network-device controller B, the event receiver B1 receives the event information from the event notification device A and delivers it to the configuration determination unit B2. The latter recognizes the fact that an event occurred at the communication terminal C and determines, based upon the type of event, whether configuring of bandwidth is required. If configuring is required, the configuration determination unit B2 refers to the communication-quality value (bandwidth information) that has been set in advance for this user and decides that communication is to be performed upon reserving the bandwidth required at the time of communication. Next, the configuration determination unit B2 notifies the device selector B3 of the event information and of the fact that configuring of bandwidth is necessary. The device selector B3 selects, among a number of network devices in the network, network devices on a communication path between the communication terminal C of the user and the communication-destination server obtained from information that has been set in advance for this user. In other words, the network-device controller B selects network devices for which configuring of bandwidth is required.

After the network devices have been selected, the device selector B3 adds address information of the devices for which the configuring of bandwidth is required onto the received information from the previous stage and delivers the resulting information to the device-specific information acquisition unit B4. The latter acquires, for each device indicated by the delivered device addresses, a method of configuring information for each device, configurable parameters and states of the devices, appends this information to the received information from the previous stage and delivers the resulting information to the configuration information generator B5. On the basis of the information received, the configuration information generator B5 determines what kind of configuration content is required for what network device and through what method, generates configuration content (bandwidth-control information) for all devices for which bandwidth required by the user must be reserved, and reports this information to the configuration information transmitter B6. On the basis of the bandwidth-control information and configuration method obtained from the configuration information generator B5, the configuration information transmitter B6 transmits the bandwidth-control information to all network devices N that need to be configured, thereby configuring these network devices.

The foregoing is for a case where bandwidth required by an user is configured as a communication-quality value. However, discard rate and delay time, etc., can also be configured in conformity with the user.

In accordance with the fifth embodiment, the configuring of quality control such as bandwidth, discard rate and delay needed for a user can be performed in a network only for devices requiring configuring, this being carried out taking user log-in as the event.

(B) First Embodiment (a) Configuration

Figure 2:
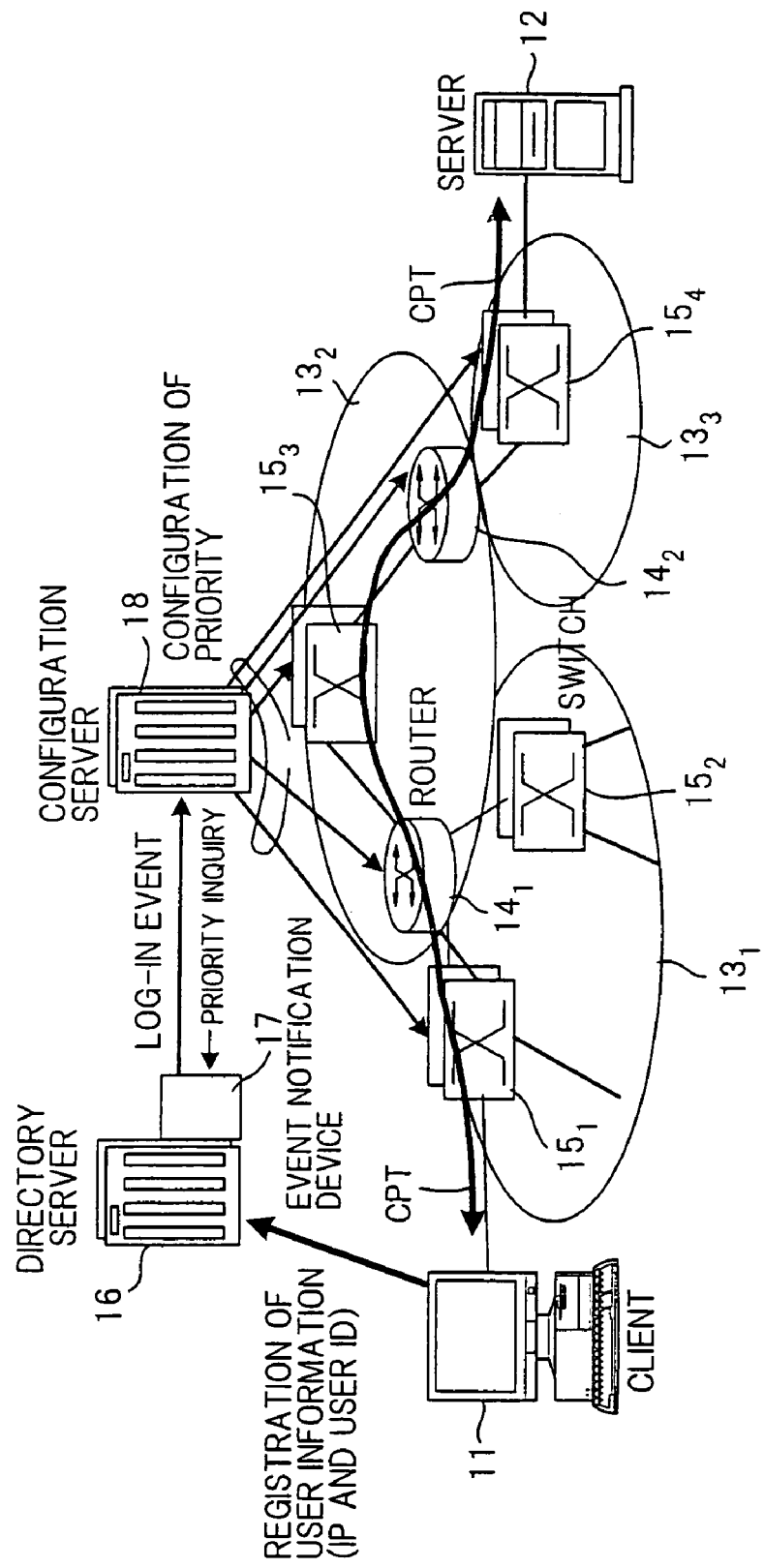
FIG. 2 is a diagram showing an example of the configuration of a network according to a first embodiment of the present invention.

FIG. 2 is a diagram showing an example of the configuration of a network according to a first embodiment of the present invention. Shown in FIG. 2 are a client 11 (end terminal) such as a personal computer; a server 12 having a function for storing data for a prescribed application, such as management application data and personnel application data, and distributing the data to clients; networks $13_1$ to $13_3$; routers $14_1$, $14_2$ for connecting these networks; switches (exchanges) $15_1$ to $15_4$ provided in the networks; a directory server 16 having a database for storing user information on a per-user (e.g., employee) basis; an event notifier 17 for detecting a log-in event and reporting event information; and a configuration server 18 which uses log-in as an event to configure the priority, which has been set for the user, for the network devices $15_1$, $14_1$, $15_3$, $14_2$, $15_4$ on a communication path CPT.

FIG. 2 illustrates an example of a network configuration for when the client 11 accesses the server 12. This assumes a situation where the client 11 accesses the server 12 via a network composed of various routers and switches and either receives information that has been stored in the server 12 from the server 12 or transmits information to the server 12 to store the data in the server 12. In order to avoid a delay in receiving time or transmitting time and the discarding of information owing to the effects of other traffic within the network at the time of such communication, each router traversed by desired traffic provides a service through which packets are transported at a priority higher than that of other traffic. A method of applying the present invention in such case will be described below.

(b) Functions of Components

The network according to the first embodiment is composed of the client 11, the server 12, the directory server 16, the event notifier 17 and the configuration server 18. The directory server 16, a Lightweight Directory Access Protocol (LDAP) for accessing this directory server, and the function through which the client 11 gives notification of log-in by LDAP constitute prior art.

(b-1) Client

The client 11 in this embodiment is an end terminal such as a personal computer. The client 11 is connected to the network. If a user logs in this client, user information (the user identifier) is reported to the directory server 16 using LDAP. More specifically, when the user logs in by entering a user identifier or password, etc., from the client 11, the latter reports the user identifier and its own IP address to the directory server 16 by LDAP.

(b-2) Directory Server

Figure 3A:
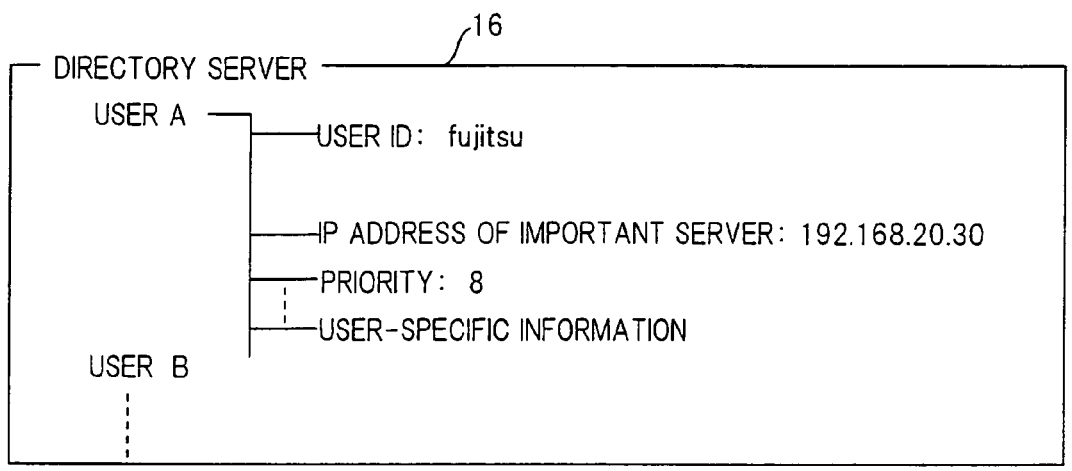
FIGS. 3A and 3B are diagrams showing an example of information that has been stored in a directory server according to the first embodiment.

The directory server 16 manages, in the form of a database, information relating to users who log in from each client. As shown in FIG. 3A, the directory server 16 retains, in a form corresponding to each user identifier, (1) the IP address of an important server accessed in dedicated fashion by the user, (2) priority when the user utilizes the network, and (3) other user-specific information. For example, if the network is one constructed within an enterprise, the following will be stored in the database of the directory server 16 in correspondence with user identification of each employee (i.e., employee number): (1) the IP address of an important server accessed in dedicated fashion by the employee for business-related reasons, (2) priority when the employee utilizes the network, (3) other specific information. Important servers accessed in dedicated fashion by an employee for business-related reasons correspond in one-to-one fashion to the section to which the employee belongs (accounting department, personnel department, planning department, patent department, technical department, etc.). Priority for utilizing a server is decided in dependence upon organization (person in charge, manager, section chief, department chief, etc.). Accordingly, the address of the important server and the priority are set in advance taking the post of the employee and the organization into account, and these are registered in the database.

Figure 3B:
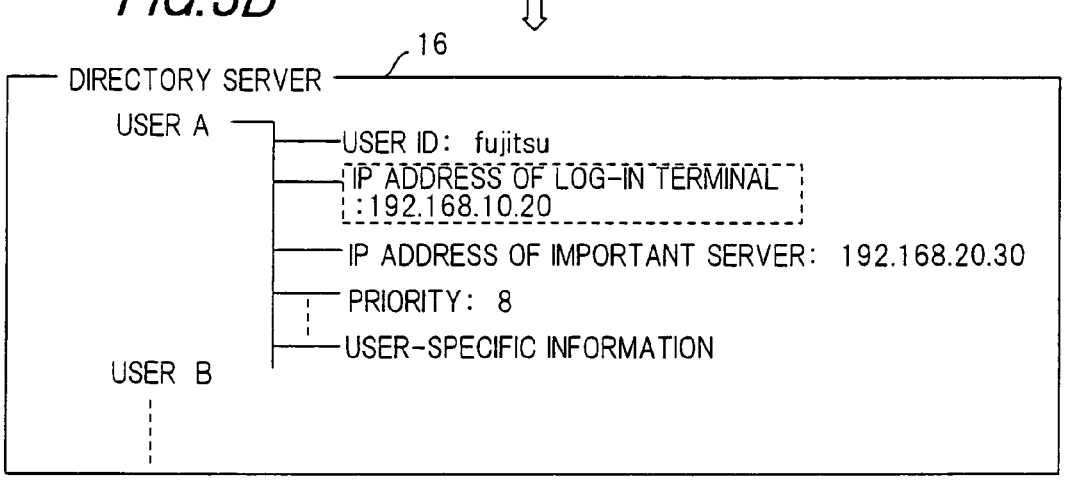

The client 11 accesses the directory server 16 using LDAP. More specifically, the client executes database processing in regard to the user information using LDAP (the processing including responding to inquiries, updating information and creating of information). When a user logs in by inputting the user identifier from the client 11, the latter reports the user identifier and the IP address of the client to the directory server 16. Upon receiving the identifier and IP address, the directory server 16 registers the IP address of the client in the database in correspondence with the above-mentioned user identifier, as shown in FIG. 3B.

For example, as shown in FIG. 3A, (1) 192.168.20.30 (=IPs) has been registered beforehand in the database of the directory server 16 and (2) 8 has been registered as the priority in the database of directory server 16 in correspondence with a user identifier "fujitsu". If user A logs in by inputting the user identifier "fujitsu" from the client 11 under these conditions, the IP address 192.168.10.20 (IPc) of the client 11 is registered in the database anew as the user-specific information of user A, as shown in FIG. 3B.

(b-3) Event Notifier

The event notifier 17 has a function for notifying the configuration server 18 of any change that has occurred on the network and of the status of the network. Though the event notifier 17 is shown as being separate from the directory server 16 in FIG. 2, it is actually provided within the directory server 16. The event notifier 17 monitors a change in a prescribed item of each user in the database of the directory server 16 from a logged-off state (a state in which there is no record of a logged-in client) to a logged-in state (a state in which there is a record of a logged-in client) and, if a change has occurred, notifies the configuration server 18 of (1) the user identifier for which the change has occurred, (2) the IP address of the client who has logged in, and (3) the fact that an event has occurred due to log-in (i.e., the type of event).

The monitoring of a change in prescribed items in the database can be implemented by having the event notifier 17 read out the database information of the directory server 16 periodically and compare the information with that read out previously.

(b-4) Configuration Server

The configuration server 18 has the following functions (1) to (4):

(1) Upon receiving notification of the user log-in event from the event notifier 17, the configuration server 18 uses the user identifier as a key to query the directory server 16 as to the IP address of the important server utilized by the user and the priority of the user and obtains responses regarding the IP address and user priority.

(2) Next, using IP routing information from the IP address of the client 11 and the IP address of the server 12, the configuration server 18 specifies the routers $14_1$, $14_2$ and the switches $15_1$, $15_3$, $15_4$ that relay the sent and received traffic that occurs between the client 11 and the server 12. More specifically, the configuration server 18 identifies the network devices on the communication path CPT between the client 11 and server 12. This identification processing performed by the relaying routers is executed as follows: If the network is one which uses OSPF (Open Shortest Path First) as the IP routing protocol, the configuration server 18 receives an OSPF LSA (Link State Advertisement) packet that has been broadcast within the network. The LSA packet contains topology information indicating the router connection relationship. When the LSA packet is received, therefore, the router topology can be ascertained. On the basis of this topology information, the shortest path is calculated from the known IP addresses of the client 11 and server 12 using the Dijkstra algorithm and, hence, the IP routing information is obtained. The configuration server 18 is capable of obtaining the path between the client and server through this procedure. That is, the configuration server 18 is capable of identifying the relaying routers.

Figures 4A, 4B, 4C:
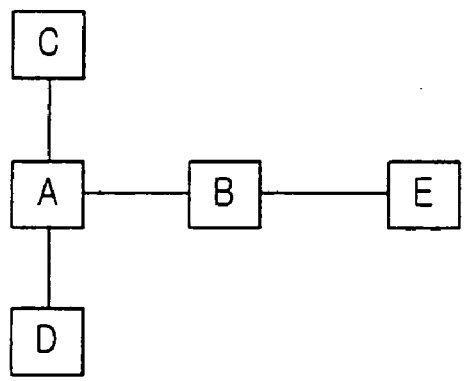
FIGS. 4A, 4B and 4C are diagrams useful in describing the topology of network devices.

FIGS. 4A to 4C are diagrams useful in describing the router topology information. In a case where routers A to E are connected as shown in FIG. 4C, the topology information of router A is a list of IP addresses of the adjacent routers, as shown in FIG. 4A, and the topology information of router B is a list of IP addresses of the adjacent routers, as shown in FIG. 4B. In other words, FIG. 4A expresses the fact that router A having the IP address 192.168.15.1 has been connected to the three routers B, C and D. In regard to router B having the IP address 192.168.10.1 among these three routers, it is indicated that there are two adjacent routers, namely routers A and E, as shown in FIG. 4B. Thus, a list of other routers to which a certain router is connected is expressed as one table and these tables are prepared in a number equivalent to the number of nodes, thereby expressing the topology of the network.

(3) The configuration server 18 acquires information relating to each router (the states of the routers and configuration items) from the obtained IP addresses of the relaying routers. The states and configuration items are, e.g., configurable parameters, parameters that have already been configured, protocols utilized in configuring and the methods of configuration.

These items of information may be applied to the configuration server 18 in advance, or each router may be inquired about them using a protocol such as SNMP (Simple Network Management Protocol), or they may be registered together with user information as one item of network-device information (router information) and obtained by querying the directory server 16 using LDAP with the IP address of the router serving as a key. For example, the fact that logging in to a router is performed by Telnet, the fact that a determined ID and password are necessary, and the fact that it is possible to make various settings and obtain information by execution of commands are stipulated by the router information.

Figure 5:
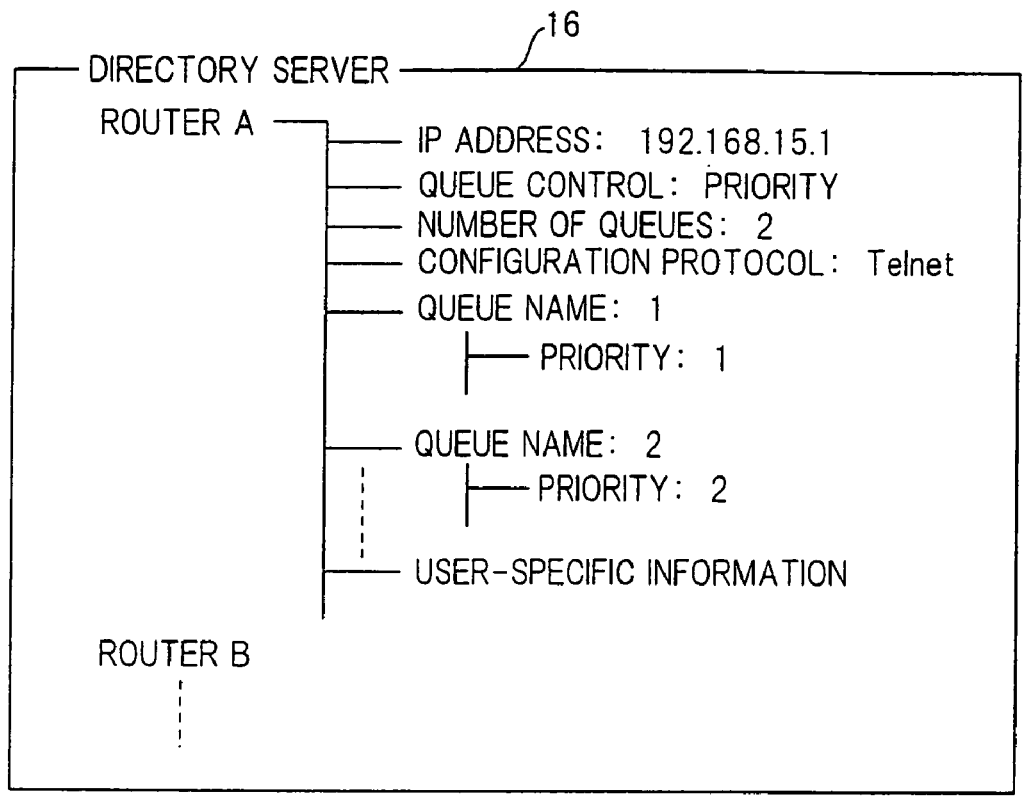
FIG. 5 is a diagram showing an example of router information that has been stored in a directory server.

FIG. 5 illustrates an example of a case where router information has been stored in the directory server 16. The attributes of the router A are stored in the form of a sub-tree of a tree structure. The attributes are the IP address of the router, the queue control scheme (the name "priority" is entered here and signifies a priority control scheme), the number (two) of queues, the configuration protocol (Telnet in this example) and the names (Queue 1, Queue 2) assigned to the respective queues. This illustrates a case in which priorities 1, 2 have been entered for the queues.

Figure 6:
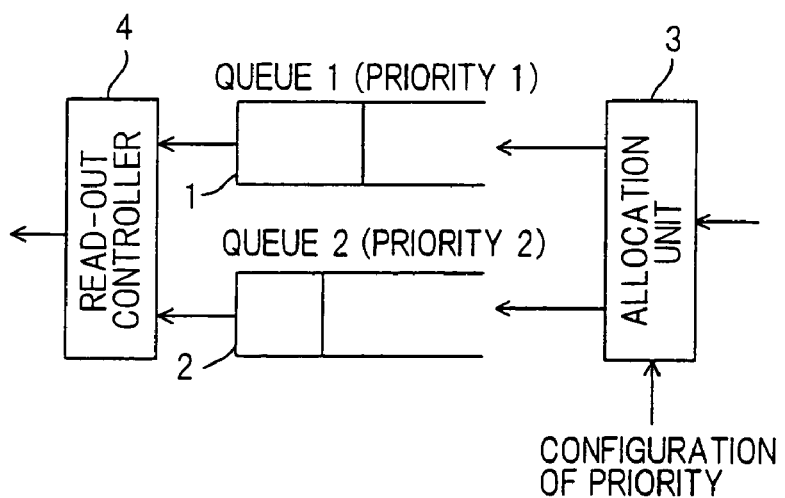
FIG. 6 is a diagram useful in describing priority control.

FIG. 6 is a diagram useful in describing a priority control scheme for a router. The scheme includes the queue 1 of priority 1 (the highest priority), the queue 2 of priority 2 (the lowest priority), an allocation unit 3 for allocating input packets to the queues 1, 2, and a readout controller 4 for reading packets out of the queue 1 of highest priority in the order of arrival, outputting the packets to a line and, only when no packets are present in the queue of highest priority, for reading packets out of the queue 2 of lowest priority in the order of arrival and outputting the packets to the line. In order to subject a prescribed packet to high-priority processing, the fact that the packet is to be processed at the high priority is set in the allocation unit 3 together with the packet identification data. In response, from among the arriving packets, the allocation unit 3 inputs the packet having the above-mentioned identification data to the high-priority queue 1 so that the packet is subjected to high-priority processing.

(4) On the basis of the priority of the user, the configuration server 18 obtains a priority control parameter to configure the network device. For example, if the user priority entered from the directory server 16 is 8 and a router can be set to only two, namely high and low, priorities, the configuration server 18 determines whether the user priority of 8 is the high or low priority and, if it is the high priority, configures the router to the high priority.

By repeating the above configuring for each router, the configuring of the priority of all routers on the communication path from the client 11 to the server 12 will eventually be completed and, as a result, it will be possible to provide a service for communicating traffic between the client and server at a priority higher than that of other traffic.

(c) Priority Configuration Sequence

FIG. 7 is a diagram useful in describing a priority configuration sequence according to the first embodiment. This illustrates a case in which when the user has logged in from the client 11, the configuration server 18 uses log-in as an event to perform control of priority by configuring the routers $14_1$, $14_2$ on the communication path with priority control information in accordance with a priority set in advance for this user.

I. When the user having the user identifier "fujitsu" logs in to the communication terminal (client) 11 having the IP address 192.169.10.20 (=IPc), the client 11 sends the directory server 16 an LDAP message for updating the information concerning the user identifier "fujitsu". The LDAP message contains the user identifier "fujitsu" and the IP address of the client. The directory server 16 registers the IP address of the client in association with the user identifier "fujitsu" in the database (see FIG. 3B).

II. The event notifier 17 within the directory server 16 detects log-in and notifies the configuration server 18 of the fact that a user having the user identifier "fujitsu" has logged in to the client 11 having the IP address IPc.

III. The configuration server 18 queries the directory server in regard to the priority of the user by LDAP using the user identifier "fujitsu" as the key and obtains, as a response, the fact that the address of the server 12 is 192.168.20.30 (=IPs) and that the priority is 8.

IV. Next, on the basis of OSPF information, the configuration server 18 finds a router that relays the communication between the client 11 and the server 12. Assume that the IP address of the one router $14_1$ is "192.168.15.1 (=IPr)".

V. The configuration server 18 obtains the state of the router $14_1$ and information (FIG. 5) relating to the configuration items. As a result, the router $14_1$ can be configured using Telnet and it is ascertained that this router possesses two priority settings, namely high and low.

VI. If the priority that has been assigned to the user identifier "fujitsu" has a value of 8 (the maximum value being 10) among ten priority levels, the configuration server 18 recognizes that the router $14_1$ is to be configured for high-priority processing. Next, the configuration server 18 performs Telnet communication for the router $14_1$ of IP address IPr and establishes a high priority for communication for which the IP address on the originating side is IPc and the IP address at the destination is IPs.

VII. The configuring of priority processing described above is performed for other routers as well.

(d) Modification

In the embodiment set forth above, a router on the communication path between the client and server is found using OSPF. However, the topology and IP communication path may be found based upon other routing protocol information such as RIP (Routing Information Protocol) and a network management protocol such as SNMP may be used. Further, the client 11 may execute traceroute processing with regard to a destination IP address, thereby finding the IP address of a router on the communication path so that this information may be acquired by the configuration server 18. With this method, the configuration server need not compute topology information and path.

According to the above-described embodiment, user information has been stored in the directory server. However, the state of log-in can be managed also by using another database having a data management function.

With the foregoing embodiment, LDAP is utilized for the delivery of user data. However, any protocol can be utilized as long as it is capable of acquiring data.

In the foregoing embodiment, the case assumed is one in which the priority of the user or the IP address of an important server is obtained. In a case where these are not obtained, however, configuring need not be performed or a priority or IP address given beforehand may be set instead of these values.

Further, according to the foregoing embodiment, only one important server exists. However, in a case where there are a plurality of servers, the above-described embodiment can be applied to each one.

Further, according to the foregoing embodiment, configuring of priority is attempted for all relaying routers. However, the configuring of priority may be performed for a router decided in advance. The configuring of priority may be performed even for switches of a MAC (Media Access Control) layer in addition to relaying routers present on the communication path.

Further, according to the foregoing embodiment, the configuring of priority is carried out when an event occurs. However, the configuration server may periodically check for a change in path information or user information and, when such a change is detected, may cancel the original settings and then perform a reconfiguring operation, thereby making possible control of priority for dealing with a change in network configuration or user information after settings have been made. Alternatively, the event detector may detect a change in user information and network configuration and notify the configuration server, in response to which the configuration server may cancel the original setting and then perform a reconfiguring operation. Further, the monitoring of a change in a prescribed item in the database can be implemented by adding on an event detector as part of the function for writing data from the directory server 16 to the database.

The modification set forth above can be applied to embodiments described below as well.

(C) Second Embodiment

(a) Construction

FIG. 8 is a diagram illustrating an example of the construction of a second embodiment of the present invention. Components identical with those of the first embodiment shown in FIG. 2 are designated by like reference characters.

According to the second embodiment, the event notifier 17 performs monitoring to determine that the user has launched an application at an end terminal and the configuration server 18 performs configuration for control of priority based upon detection of launching of the application (detection of an event). More specifically, the second embodiment differs from the first embodiment in terms of the monitoring function of the event notifier 17. Performing control of priority at launching of an application following log-in, as is done in the second embodiment, is better than performing control of priority at the time of log-in, as is done in the first embodiment, for the purpose of configuring the priority of a router in strict conformity with the case in which traffic is actually utilized.

As in the first embodiment, the network of this embodiment includes the client 11, the server 12, the directory server 16, the event notifier 17 and the configuration server 18.

(b) Functions of Components (b-1) Client

The client 11 is an end terminal such as a personal computer and is connected to the network. If a user logs in utilizing the client 11, user information (the user identifier) is reported to the directory server 16 using LDAP. More specifically, when the user logs in by entering a user identifier or password, etc., from the client 11, the latter reports the user identifier and its own IP address to the directory server 16 by LDAP. Similarly, if a certain user launches a prescribed application using the client 11, the latter registers the application information (the application identifier and the IP address of the server with which this application communicates) in the directory server 16 using LDAP.

(b-2) Directory Server

The directory server 16 manages, in the form of a database, information relating to users and information relating to applications launched by users. More specifically, the directory server 16 retains, in the form of a database, (1) a user identifier, (2) the IP address of an end terminal at which the user has logged in, (3) the identifier of an application utilized by the user, (4) the IP address of the server with which this application communicates, and (5) the priority for when the user utilizes the network (see FIG. 9C). The client 11, which is an end terminal, accesses the directory server 16 using LDAP and subjects the user information to database processing (processing such as responding to inquiries, updating information and creating information). When a user has logged in or launched an application, the client 11 notifies the directory server 16 of the information relating to the user or of the information relating to the application.

Figure 9A:
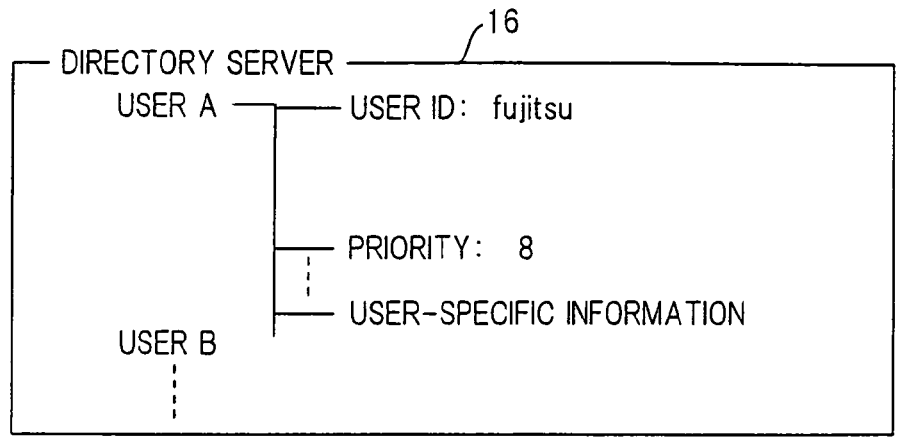
FIGS. 9A, 9B and 9C are diagrams showing an example of information that has been stored in a directory server according to the second embodiment.
Figure 9B:
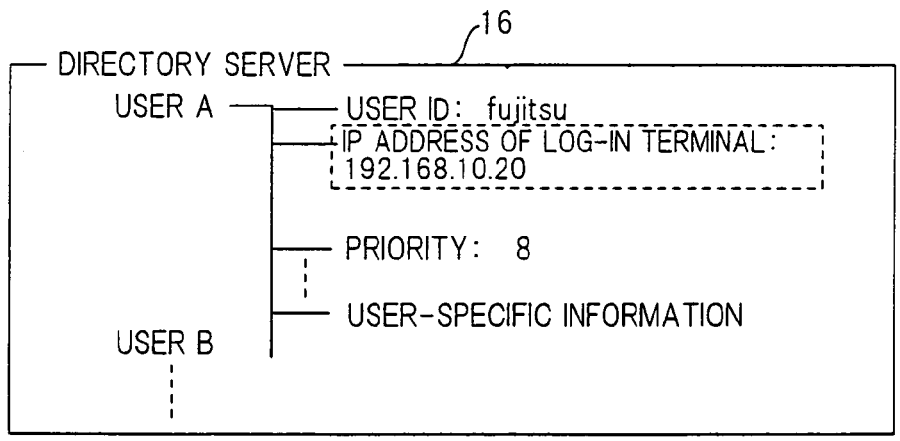

As shown in FIG. 9A, (1) the priority for when the user utilizes the network and (2) other user-specific information have initially been registered in the database of directory server 16 in correspondence with a user identifier. If the user logs in by inputting the user identifier from the client 11 under these conditions, the client 11 notifies the directory server 16 of the user identifier and IP address of the client by LDAP. Upon receiving the identifier and IP address, the directory server 16 registers the IP address of the client in the database in correspondence with the above-mentioned user identifier, as shown in FIG. 9B. For example, as shown in FIG. 9A, 8 has been registered as the priority in the database of directory server 16 in correspondence with the user identifier "fujitsu". If user A logs in by inputting the user identifier "fujitsu" from the client 11 under these conditions, the IP address 192.168.10.20 (=IPc) of the client 11 is registered in the database anew as the user-specific information of user A, as shown in FIG. 9B.

Figure 9C:
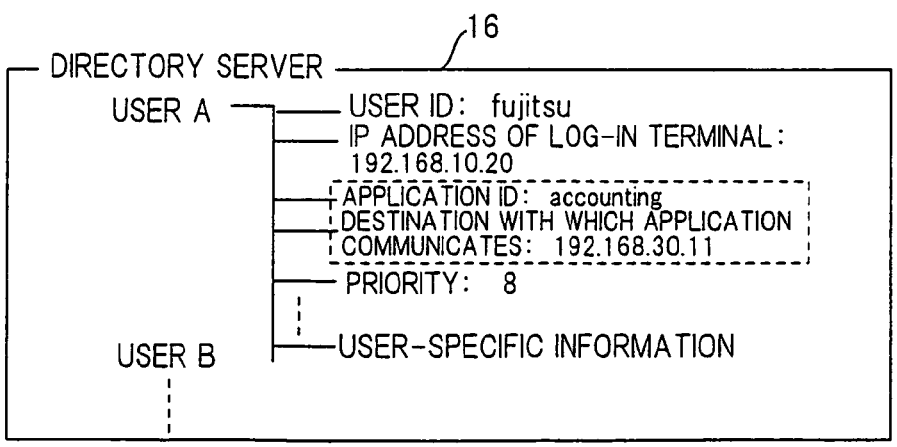

Similarly, if the user launches an application that utilizes an accounts database, the client 11 notifies the directory server 16 of the identifier "accounting" of the above-mentioned application and of the IP address "192.168.30.11 (=IPa)" of the accounts server 12, which is the destination with which this application communicates, by LDAP. Upon being so notified, the directory server 16 registers the application identifier "accounting" and the IP address 192.168.30.11 (=IPa) in the database, as shown in FIG. 9C.

(b-3) Event Notifier

The event notifier 17 has a function for notifying the configuration server 18 of any change that has occurred on the network and of the status of the network. Though the event notifier 17 is shown as being separate from the directory server 16, it is actually provided within the directory server 16. The event notifier 17 monitors, on a per-user basis, a change in state from an application-inactive state (a state in which an application identifier has not been registered in the directory server) to an application-launched state (a state in which an application identifier has been registered in the directory server) and, if a change has occurred, notifies the configuration server 18 of (1) the IP address IPc of the end terminal that launched the application, (2) the identifier of the launched application, (3) the IP address IPa of the destination with which the application communicates, and (4) the fact that an application-launch event has occurred (i.e., the type of event).

The monitoring of a change in application information in the database can be implemented by having the event notifier 17 read out the database information of the directory server 16 periodically and compare the information with that read out previously.

(b-4) Configuration Server

The configuration server 18 has the following functions (1) to (4):

(1) Upon receiving notification of the application-launch event from the event notifier 17, the configuration server 18 uses the IP address of the end terminal that launched this application as a key to query the directory server 16 as to the priority of the user who is utilizing the end terminal and obtains a response regarding this inquiry. In this embodiment, a response to the effect that the priority is 8 is obtained when the directory server 16 is queried using the IP address IPc as the key.

It should be noted that an arrangement can be adopted in which the configuration server 18 has the event notifier 17 report the user identifier in addition to the application information, uses this user identifier to query the directory server 16 with regard to the priority of the user who is utilizing the end terminal and acquires this priority.

(2) Next, through a method similar to that of the first embodiment, the configuration server 18 uses the reported IP addresses of the client 11 and server 12 and the IP routing information to specify the routers $14_1$, $14_2$ and the switches $15_1$, $15_3$, $15_4$ that relay the sent and received traffic that occurs between the client 11 and the server 12. More specifically, the configuration server 18 identifies the network devices on the communication path CPT between the client 11 and server 12.

(3) The configuration server 18 acquires information relating to each router (the states of the routers and the configuration items) from the obtained IP addresses of the relaying routers $14_1$, $14_2$.

(4) On the basis of the router information and priority of the user, the configuration server 18 generates a priority control parameter to configure the router and sets this parameter in the router. For example, if the user priority entered from the directory server 16 is 8 and a router can be set to only two, namely high and low, priorities, the configuration server 18 determines whether the user priority of 8 is the high or low priority and, if it is the high priority, sets the router to the high priority.

By repeating the above configuring for each router, the configuring of the priority of all routers on the communication path from the client 11 to the server 12 will eventually be completed and, as a result, it will be possible to provide a service for communicating traffic between the client and server at a priority higher than that of other traffic.

(c) Priority Configuration Sequence

FIG. 10 is a diagram useful in describing a priority configuration sequence according to the first embodiment. This illustrates a case in which when the user has logged in from the client 11 and then launched an application, the configuration server 18 uses launching of the application as an event to perform priority control by configuring the routers $14_1$, $14_2$ on the communication path with priority control information in accordance with a priority set in advance for this user.

I. When the user having the user identifier "fujitsu" logs in to the communication terminal (client) 11 having the IP address 192.169.10.20 (=IPc), the client 11 sends the directory server 16 an LDAP message for updating the information concerning the user identifier "fujitsu". Accordingly, the LDAP message contains the user identifier "fujitsu" and the IP address of the client. The directory server 16 registers the IP address of the client in association with the user identifier "fujitsu" in the database (see FIG. 9B).

II. When the user having the user identifier "fujitsu" launches a prescribed application at the client 11 having the IP address IPc, this client sends the directory server 16 an LDAP message in order to register the application information in the directory server 16. The LDAP message contains, as application information, (1) the application identifier "accounting" launched by the user having the user identifier "fujitsu", and (2) the IP address 192.168.30.11 (=IPa) of the server with which the application communicates. Accordingly, the directory server 16 registers the application identifier "accounting" and the IP address 192.168.30.11 (=IPa) of the server with which this application communicates in the database in association with the user identifier "fujitsu" (see FIG. 9C).

III. If the event notifier 17 within the directory server 16 detects launching of the application, the event notifier 17 notifies the configuration server 18 of the fact that an application which has the application identifier "accounting" and which communicates with a server having the IP address IPa has been launched at the client 11 having the IP address IPc.

IV. The configuration server 18 queries the directory server 16 in regard to the priority of the user by LDAP using the IP address (=IPc) of the communication terminal as the key and obtains, as a response, the fact that the priority is 8.

V. Next, on the basis of OSPF information, the configuration server 18 finds a router that relays the communication between the client 11 and the server 12. Assume that the IP address of the one router $14_1$ is "192.168.15.1 (=IPr)".

VI. The configuration server 18 obtains the state of the router $14_1$ and information (FIG. 5) relating to the configuration items. As a result, the router $14_1$ can be configured using Telnet and it is ascertained that this router possesses two priority settings, namely high and low.

VII. If the priority that has been assigned to the user identifier "fujitsu" has a value of 8 (the maximum value being 10) among ten priority levels, the configuration server 18 recognizes that the router $14_1$ is to be configured for high-priority processing. Next, the configuration server 18 performs Telnet communication for the router $14_1$ of IP address IPr and establishes a high priority for communication for which the IP address on the originating side is IPc and the IP address at the destination is IPs.

VIII. The configuring of priority processing described above is performed for other routers as well.

(D) Third Embodiment (a) Construction

Figure 11:
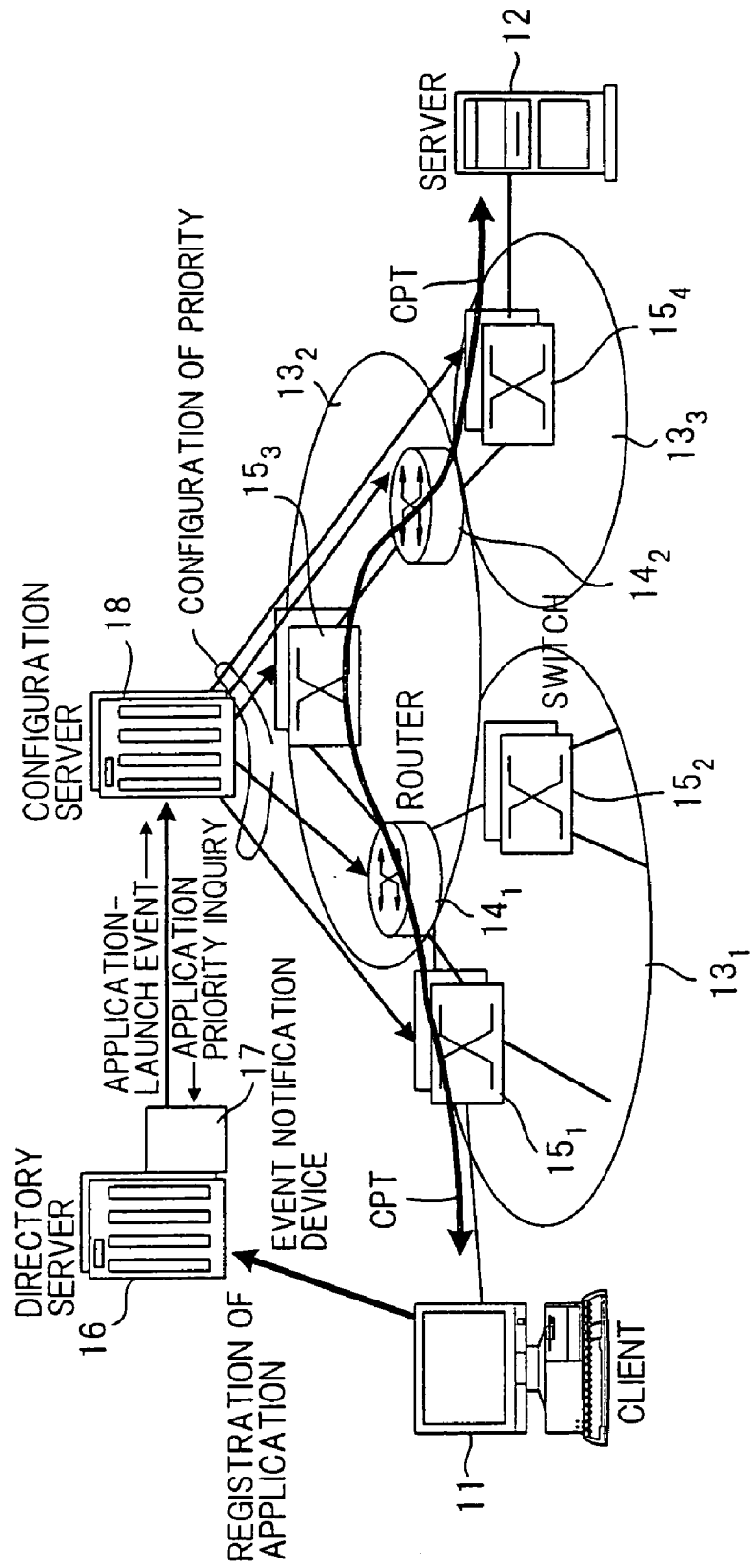
FIG. 11 is a diagram showing an example of the configuration of a network according to a third embodiment of the present invention.

FIG. 11 is a diagram illustrating an example of the construction of a third embodiment of the present invention. Components identical with those of the second embodiment shown in FIG. 8 are designated by like reference characters.

According to the third embodiment, the event notifier 17 performs monitoring to determine that an application has been launched at an end terminal and, on the basis of detection of application launch (event detection), the configuration server 18 configures priority for a router on the communication path of the application. In the second embodiment, configuring of priority is performed for a router by utilizing a priority that is decided for each user. In the third embodiment, however, configuring of priority is performed for a router by utilizing a priority that is decided for each application. In accordance with the third embodiment, priority control made to conform to the characteristics of the application becomes possible.

As in the first and second embodiments, the network according to the third embodiment includes the client 11, the server 12, the directory server 16, the event notifier 17 and the configuration server 18.

(b) Functions of Components (b-1) Client

The client 11 is an end terminal such as a personal computer and is connected to the network. If a user logs in utilizing the client 11, user information (the user identifier) is registered in the directory server 16 using LDAP. More specifically, when the user logs in by entering a user identifier or password, etc., from the client 11, the latter registers the user identifier and its own IP address in the directory server 16 by LDAP. Similarly, if a certain user launches a prescribed application using the client 11, the latter registers the application information (the application identifier and the IP address of the server with which the application communicates) in the directory server 16 using LDAP.

It should be noted that if application priority and the IP address of the communication-destination server of the application have been registered in the directory server 16 in association with the application identifier, the client need only register the application identifier in the directory server 16 as the application information.

(b-2) Directory Server

The directory server 16 manages, in the form of a database, information relating to users and information relating to applications launched by users. The user information contains (1) the user identifier, (2) the IP address of the end terminal at which the user has logged in, (3) the identifier of the application utilized by the user, (4) the IP address of the server with which this application communicates, and (5) other specific information (see FIG. 11C). Further, the application information contains (1) the application identifier and (2) the priority of the application. However, the application information can include the IP address of the server with which the application communicates.

The client 11, which is an end terminal, accesses the directory server 16 using LDAP and subjects the user information to database processing (processing such as responding to inquiries, updating information and creating information). When a user has logged in or launched an application, the client 11 notifies the directory server 16 of the information relating to the user or of the information relating to the application.

Figure 12A:
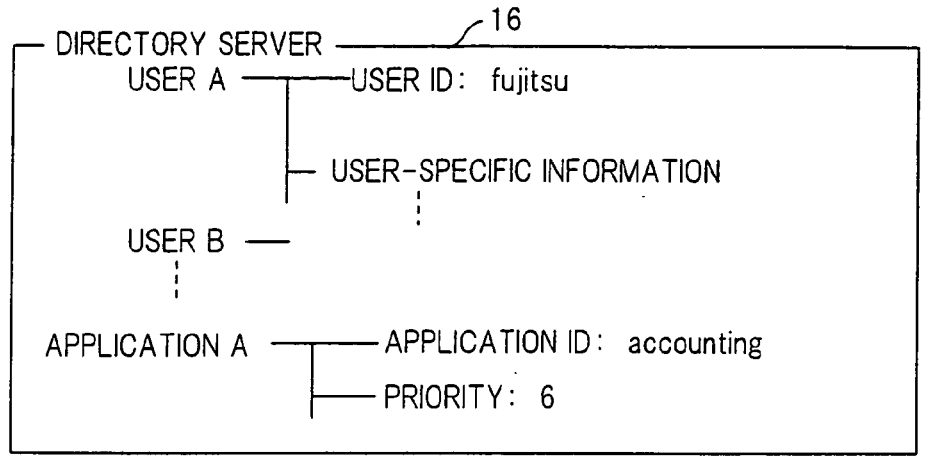
FIGS. 12A, 12B and 12C are diagrams showing an example of information that has been stored in a directory server according to the third embodiment.

As shown in FIG. 12A, only user-specific information has initially been registered in the directory server 16 in correspondence with a user identifier. An application priority of 6 has been registered in correspondence with the application identifier "accounting".

Figure 12B:
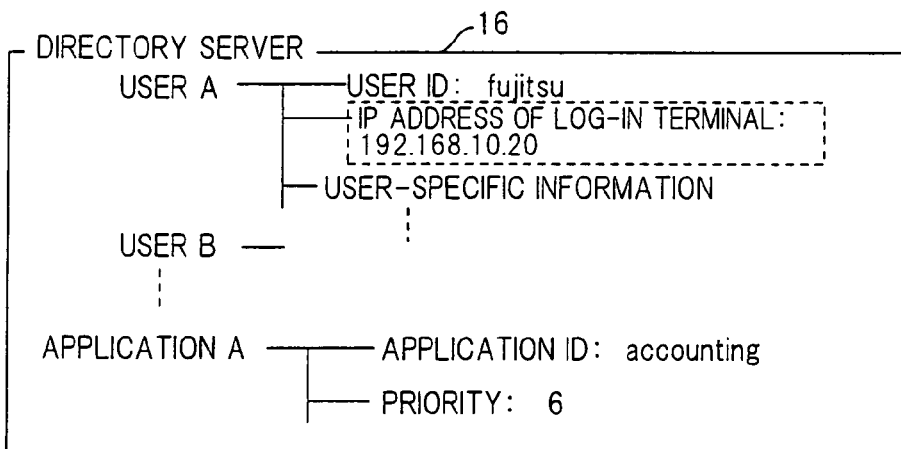

If the user logs in by inputting the user identifier from the client 11 under these conditions, the client 11 notifies the directory server 16 of the user identifier and IP address of the client by LDAP. Upon receiving the identifier and IP address, the directory server 16 registers the IP address 192.168.10.20 (=IPc) of the client in correspondence with the above-mentioned user identifier, as shown in FIG. 12B.

Figure 12C:
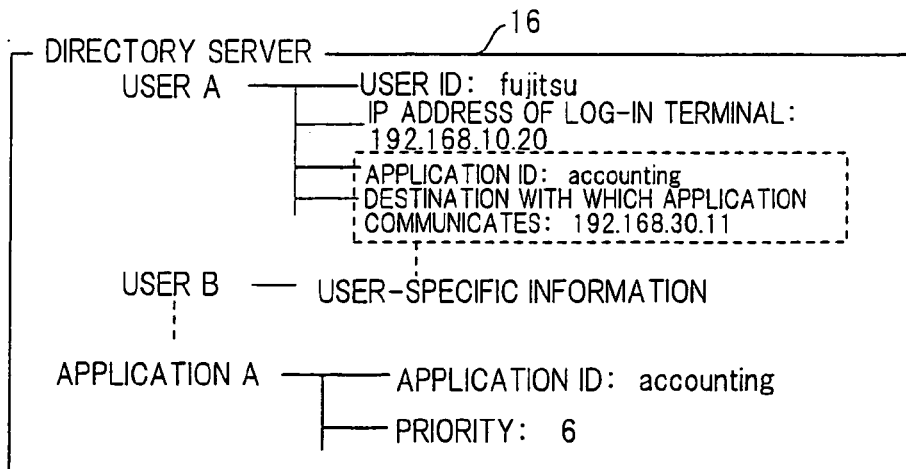

Similarly, if the user launches an application that utilizes an accounts database, for example, the client 11 notifies the directory server 16 of the identifier "accounting" of the above-mentioned application and of the IP address "192.168.30.11 (=IPa)" of the accounts server 12, which is the destination with which this application communicates, by LDAP. Upon being so notified, the directory server 16 registers the application identifier and the IP address of the server, which is the destination with which the application communicates, in the database, as shown in FIG. 12C.

(b-3) Event Notifier

The event notifier 17 has a function for notifying the configuration server 18 of any change that has occurred on the network and of the status of the network. Though the event notifier 17 is shown as being separate from the directory server 16, it is actually provided within the directory server 16. The event notifier 17 monitors, on a per-user basis, a change in state from an application-inactive state to an application-launched state and, if a change has occurred, notifies the configuration server 18 of (1) the IP address IPc of the end terminal that launched the application, (2) the identifier of the launched application, (3) the IP address IPa of the destination with which the application communicates, and (4) the fact that an application-launch event has occurred (i.e., the type of event).

The monitoring of a change in application information in the database can be implemented by having the event notifier 17 read out the database information of the directory server 16 periodically and compare the information with that read out previously.

(b-4) Configuration Server

The configuration server 18 has the following functions (1) to (4):

(1) Upon receiving notification of the application-launch event from the event notifier 17, the configuration server 18 uses the application identifier contained in the event notification as a key to query the directory server 16 as to the priority, on the network, of the application that has been launched at the end terminal, and obtains a response regarding this inquiry. In this embodiment, a response to the effect that the priority is 6 is obtained when the directory server 16 is queried using the application identifier "accounting" as the key.

(2) Next, through a method similar to that of the first embodiment, the configuration server 18 uses the reported IP addresses of the client 11 and server 12 and the IP routing information to specify the routers $14_1$, $14_2$ and the switches $15_1$, $15_3$, $15_4$ that relay the sent and received traffic that occurs between the client 11 and the server 12. More specifically, the configuration server 18 identifies the network devices (routers and switches) on the communication path CPT between the client 11 and server 12.

(3) The configuration server 18 acquires information relating to each router (the states of the routers and the configuration items) from the obtained IP addresses of the relaying routers.

(4) On the basis of the router information and priority of the application, the configuration server 18 generates a priority control parameter to configure the router and, using a setting protocol, sets this parameter in the router that relays the communication between the client and the server. By repeating the above configuring for each router, the configuring of the priority of all routers on the communication path from the client 11 to the server 12 will eventually be completed and, as a result, it will be possible to provide a service for communicating traffic between the client and server at a priority higher than that of other traffic.

(c) Priority Configuration Sequence

Figure 13:
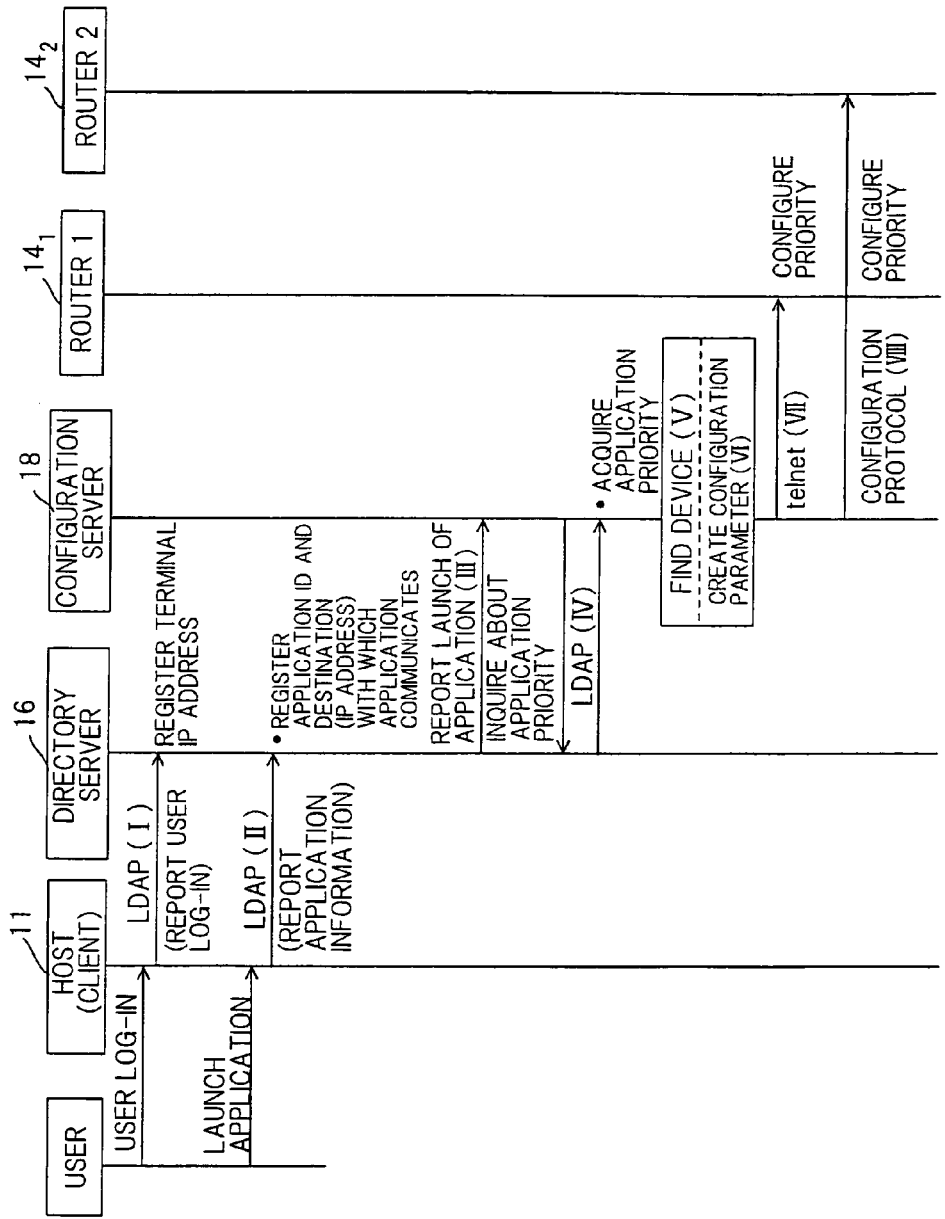
FIG. 13 is a diagram useful in describing a sequence according to a third example of the present invention.

FIG. 13 is a diagram useful in describing a priority configuration sequence according to the third embodiment. This illustrates a case in which when the user has logged in from the client 11 and then launched an application, the configuration server 18 uses launching of the application as an event to perform priority control by configuring priority control information for the routers $14_1$, $14_2$ on the communication path in accordance with a priority set in advance for this application.

I. When the user having the user identifier "fujitsu" logs in to the communication terminal (client) 11 having the IP address 192.169.10.20 (=IPc), the client 11 sends the directory server 16 an LDAP message for updating the information concerning the user identifier "fujitsu". The LDAP message contains the user identifier "fujitsu" and the IP address of the client. Accordingly, the directory server 16 registers the IP address of the client in association with the user identifier "fujitsu" in the database (see FIG. 11B).

II. When the user having the user identifier "fujitsu" launches a prescribed application at the client 11 having the IP address IPc, this client sends the directory server 16 an LDAP message in order to register the application information. The LDAP message contains, as application information, the application identifier "accounting" launched by the user having the user identifier "fujitsu", and the IP address 192.168.30.11 (=IPa) of the server with which the application communicates. Accordingly, the directory server 16 registers the application identifier "accounting" and the IP address 192.168.30.11 (=IPa) of the server with which this application communicates in the database in association with the user identifier "fujitsu" (see FIG. 12C).

III. If the event notifier 17 within the directory server 16 detects launching of the application, the event notifier 17 notifies the configuration server 18 of the fact that an application which has the application identifier "accounting" and which communicates with a server having the IP address IPa has been launched at the client 11 having the IP address IPc.

IV. The configuration server 18 queries the directory server 16 in regard to the priority of the application by LDAP using the application identifier "accounting" as the key and obtains, as a response, the fact that the priority is 6.

V. Next, on the basis of OSPF information, the configuration server 18 finds a router that relays the communication between the client 11 and the server 12. Assume that the IP address of the one router $14_1$ is "192.168.15.1 (=IPr)".

VI. The configuration server 18 obtains the state of the router $14_1$ and information relating to the configuration items. As a result, the router $14_1$ can be configured using Telnet and the configuration server 18 can ascertain that this router possesses two priority settings, namely high and low.

VII. If the priority that has been assigned to the application has a value of 6 (the maximum value being 10) among ten priority levels, the configuration server 18 recognizes that the router IPr is to be configured for high-priority processing. Next, the configuration server 18 performs Telnet communication for the router $14_1$ of IP address IPr and establishes a high priority for communication for which the IP address on the originating side is IPc and the IP address at the destination is IPa.

VIII. The configuring of priority processing described above is performed for other routers as well.

(E) Fourth Embodiment (a) Construction

Figure 14:
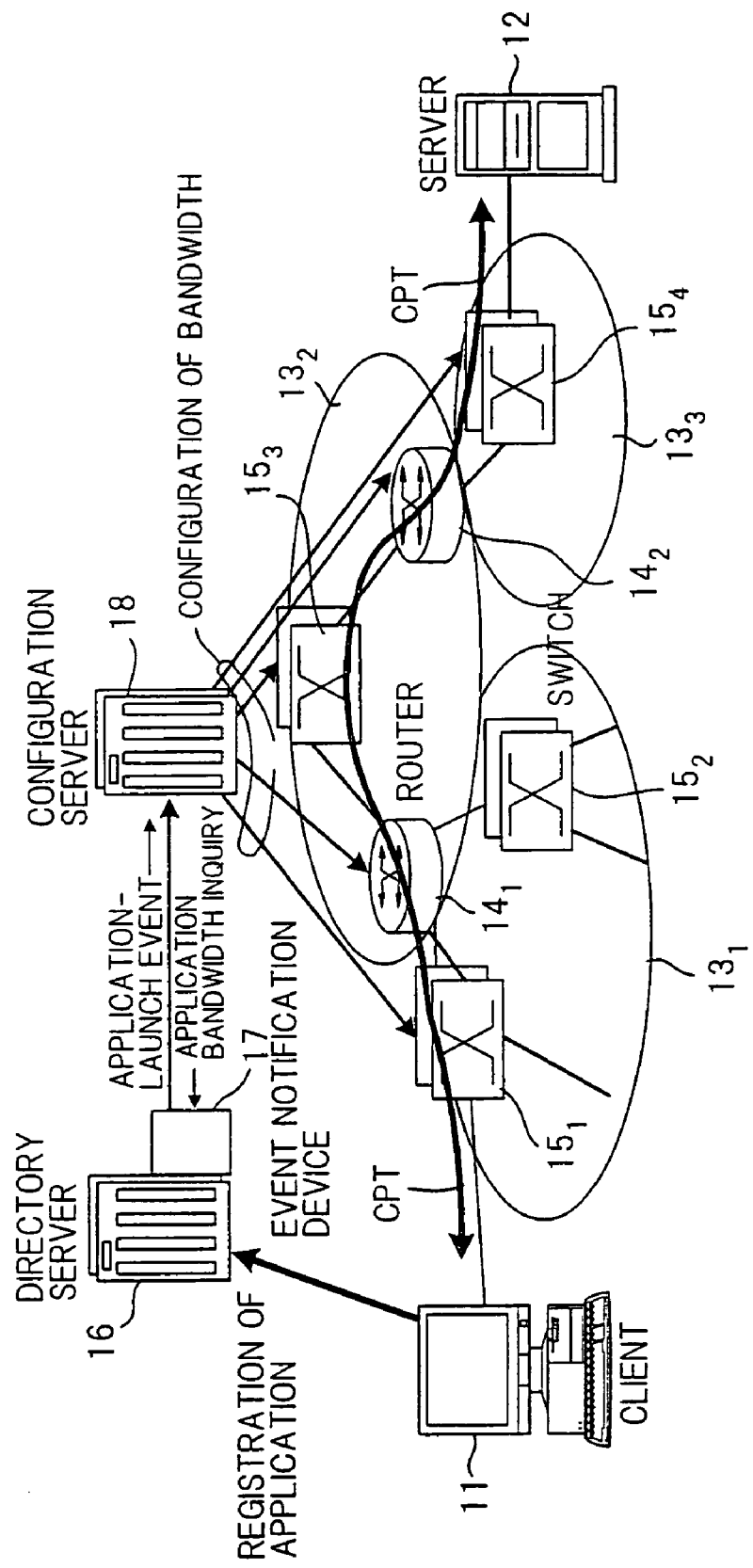
FIG. 14 is a diagram showing an example of the configuration of a network according to a fourth embodiment of the present invention.

FIG. 14 is a diagram illustrating an example of the construction of a fourth embodiment of the present invention. Components identical with those of the third embodiment shown in FIG. 11 are designated by like reference characters. In the third embodiment, priority configuration for a router on the communication path of an application is performed based upon the priority of the application. In the fourth embodiment, however, bandwidth is configured for a router on the communication path of an application based upon the bandwidth required by the application. In accordance with the fourth embodiment, it is possible to assure communication quality more reliably in comparison with priority control.

As in the first through third embodiments, the network according to the fourth embodiment includes the client 11, the server 12, the directory server 16, the event notifier 17 and the configuration server 18.

(b) Functions of Components (b-1) Client

The client 11 is an end terminal such as a personal computer and is connected to the network. If a user logs in utilizing the client 11, user information (the user identifier) is registered in the directory server 16 using LDAP. More specifically, when the user logs in by entering a user identifier or password, etc., from the client 11, the latter registers the user identifier and its own IP address in the directory server 16 by LDAP. Similarly, if a certain user launches a prescribed application using the client 11, the latter registers the application information (the application identifier and the IP address of the communication-destination server of the application) in the directory server 16 using LDAP. Similarly, if a certain user launches a prescribed application using the client 11, the latter registers the application information (the application identifier and the IP address of the server with which the application communicates) in the directory server 16 using LDAP.

(b-2) Directory Server

The directory server 16 manages, in the form of a database, information relating to users and information relating to applications launched by users. The user information contains (1) the user identifier, (2) the IP address of the end terminal at which the user has logged in, (3) the identifier of the application utilized by the user, (4) the IP address of the server with which this application communicates, and (5) other specific information (see FIG. 15C). Further, the application information contains (1) the application identifier and (2) the bandwidth required by the application. The application information can include the IP address of the server with which the application communicates.

The client 11, which is an end terminal, accesses the directory server 16 using LDAP and subjects the user information to database processing (processing such as responding to inquiries, updating information and creation of information). When a user has logged in or launched an application, the client 11 notifies the directory server 16 of the information relating to the user or of the information relating to the application.

Figure 15A:
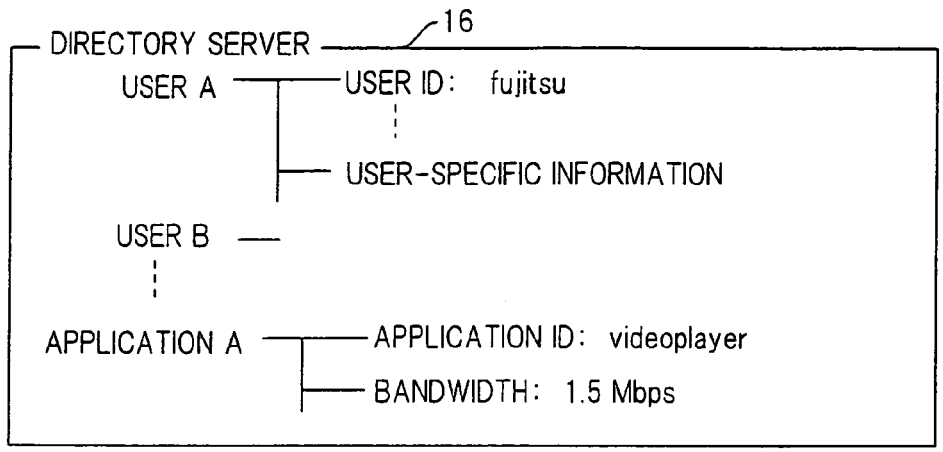
FIGS. 15A, 15B and 15C are diagrams showing example of information that has been stored in a directory server according to the third embodiment.
Figure 15B:
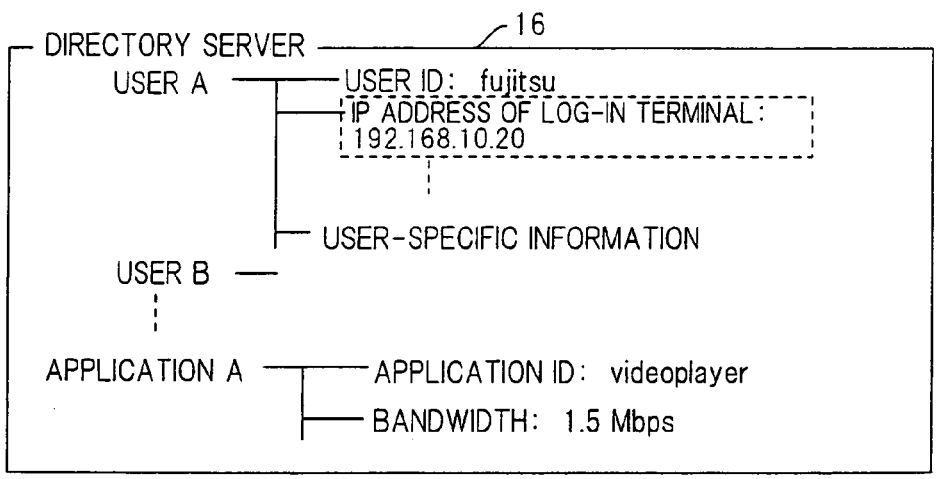

As shown in FIG. 15A, only user-specific information has initially been registered in the =directory server 16 in correspondence with a user identifier. A bandwidth of 1.5 Mbps required by the application has been registered in correspondence with the application identifier "videoplayer". If the user logs in by inputting the user identifier "fujitsu" from the client 11 under these conditions, the client 11 notifies the directory server 16 of the user identifier and IP address 192.168.10.20 (=IPc) of the client by LDAP. Upon receiving the user identifier and IP address, the directory server 16 registers the IP address IPc of the client in correspondence with the above-mentioned user identifier, as shown in FIG. 15B.

Figure 15C:
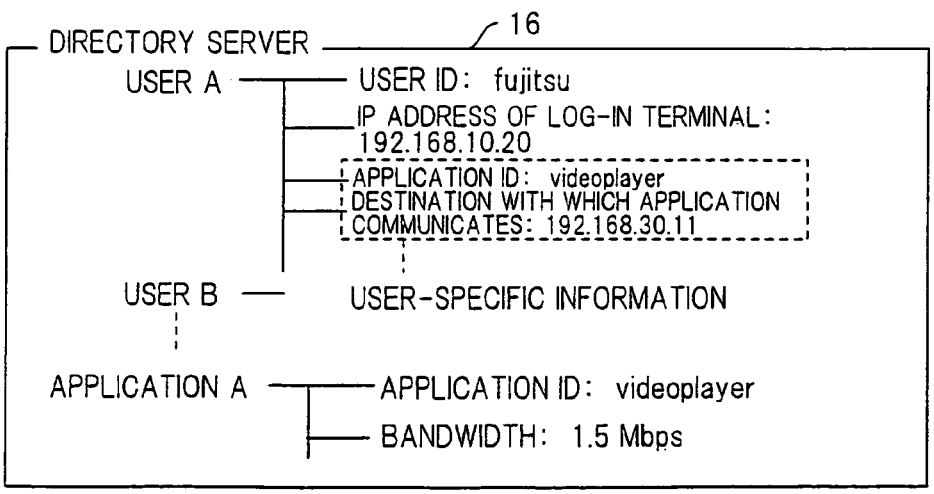

Similarly, if the user launches an application for reproducing video, the client 11 notifies the directory server 16 of the identifier "videoplayer" of the above-mentioned application and of the IP address "192.168.30.11 (=IPa)" of the video server 12, which is the destination with which this application communicates, by LDAP. Upon being so notified, the directory server 16 registers the application identifier "videoplayer" and the IP address (=IPa) of the video server, which is the destination with which the application communicates, in the user information field of the database, as shown in FIG. 15C.

(b-3) Event Notifier

The event notifier 17 has a function for notifying the configuration server 18 of any change that has occurred on the network and of the status of the network. Though the event notifier 17 is shown as being separate from the directory server 16, it is actually provided within the directory server 16. The event notifier 17 monitors, on a per-user basis, a change in state from an application-inactive state to an application-launched state and, if a change has occurred, notifies the configuration server 18 of (1) the IP address IPc of the end terminal that launched the application, (2) the identifier of the launched application, (3) the IP address IPa of the destination with which the application communicates, and (4) an event notifier "application", which indicates the fact that an application-launch event has occurred.

The monitoring of a change in application information in the database can be implemented by having the event notifier 17 read out the database information of the directory server 16 periodically and compare the information with that read out previously.

(b-4) Configuration Server

The configuration server 18 has the following functions (1) to (4):

(1) Upon receiving notification of the application-launch event from the event notifier 17, the configuration server 18 decides, based upon the event identifier "application" contained in event notification, whether to perform control for bandwidth reservation. If bandwidth control is to be performed, the configuration server 18 uses the application identifier contained in the event notification as a key to query the directory server 16 as to the bandwidth required by the application that has been launched at the end terminal, and obtains the response "1.5 Mbps" regarding this inquiry. In this embodiment, a response to the effect that the bandwidth is 1.5 Mbps is obtained when the directory server 16 is queried using the application identifier "videoplayer" as the key.

(2) Next, through a method similar to that of the first embodiment, the configuration server 18 uses the reported IP addresses of the client 11 and server 12 and the IP routing information to specify the routers $14_1$, $14_2$ and the switches $15_1$, $15_3$, $15_4$ that relay the sent and received traffic that occurs between the client 11 and the server 12. More specifically, the configuration server 18 identifies the network devices (routers and switches) on the communication path CPT between the client 11 and server 12.

(3) The configuration server 18 acquires information relating to each router (the states of the routers and the configuration items) from the obtained IP addresses of the relaying routers.

(4) On the basis of the router information and the bandwidth required by the application, the configuration server 18 generates a bandwidth control parameter to configure the router and sets this parameter in the router that relays the communication between the client and the server. By repeating the above configuring for each router, the configuring of the bandwidth of all routers on the communication path from the client 11 to the server 12 will eventually be completed. As a result, the bandwidth required by the application can be assured between the client and the server and communication can be performed at a high quality.

(c) Bandwidth Configuration Sequence

Figure 16:
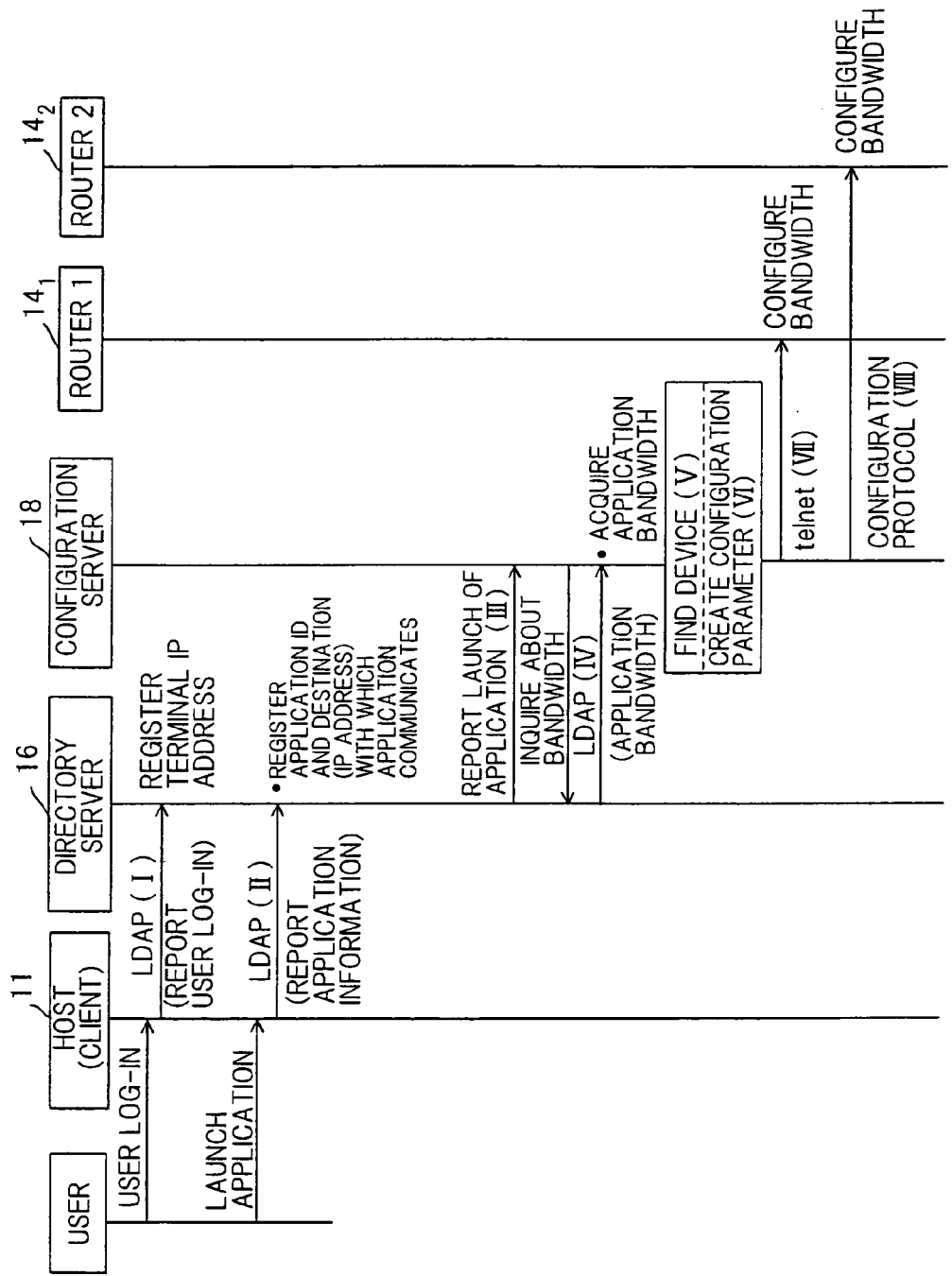
FIG. 16 is a diagram useful in describing a sequence according to a fourth example of the present invention.

FIG. 16 is a diagram useful in describing a bandwidth configuration sequence according to the fourth embodiment. This illustrates a case in which when the user has logged in from the client 11 and then launched an application, the configuration server 18 uses launching of the application as an event to perform bandwidth configuration control of the routers $14_1$, $14_2$ on the communication path in accordance with the required bandwidth set in advance for this application.

I. When the user having the user identifier "fujitsu" logs in to the communication terminal (client) 11 having the IP address 192.169.10.20 (=IPc), the client 11 sends the directory server 16 an LDAP message for updating the information concerning the user identifier "fujitsu". The LDAP message contains the user identifier "fujitsu" and the IP address of the client. Accordingly, the directory server 16 registers the IP address of the client in association with the user identifier "fujitsu" in the database (see FIG. 15B).

II. When the user having the user identifier "fujitsu" launches a prescribed application at the client 11 having the IP address IPc, this client sends the directory server 16 an LDAP message in order to register the application information. The LDAP message contains, as application information, the application identifier "videoplayer" for video reproduction launched by the user having the user identifier "fujitsu", and the IP address 192.168.30.11 (=IPa) of the video server with which the application communicates. Accordingly, the directory server 16 registers the application identifier "videoplayer" and the IP address 192.168.30.11 (=IPa) of the server with which this application communicates in the database in association with the user identifier "fujitsu" (see FIG. 15C).

III. If the event notifier 17 within the directory server 16 detects launching of the application, the event notifier 17 notifies the configuration server 18 of the fact that an application which has the application identifier "videoplayer" and which communicates with a video server having the IP address IPa has been launched at the client 11 having the IP address IPc.

IV. The configuration server 18 queries, by LDAP, the directory server 16 in regard to the bandwidth required by the application using the application identifier "videoplayer" as the key and obtains, as a response, the fact that the required bandwidth is 1.5 Mbps.

V. Next, on the basis of OSPF information, the configuration server 18 finds a router that relays the communication between the client 11 and the server 12. Assume that the IP address of the one router 14₁ is "192.168.15.1 (=IPr)".

VI. The configuration server 18 obtains router information (state and information relating to the configuration items) concerning the router 14₁. As a result, the router 14₁ can be configured using Telnet and the configuration server 18 can ascertain that this router is capable of having its bandwidth configured.

VII. The configuration server 18 performs Telnet communication with respect to the router 14₁ of IP address IPr and performs configuring to allocate the bandwidth of 1.5 Mbps for communication for which the IP address on the originating side is IPc and the IP address at the destination is IPa.

VIII. The above-described allocating of bandwidth is performed for other routers as well.

(d) Modification

Figure 17:
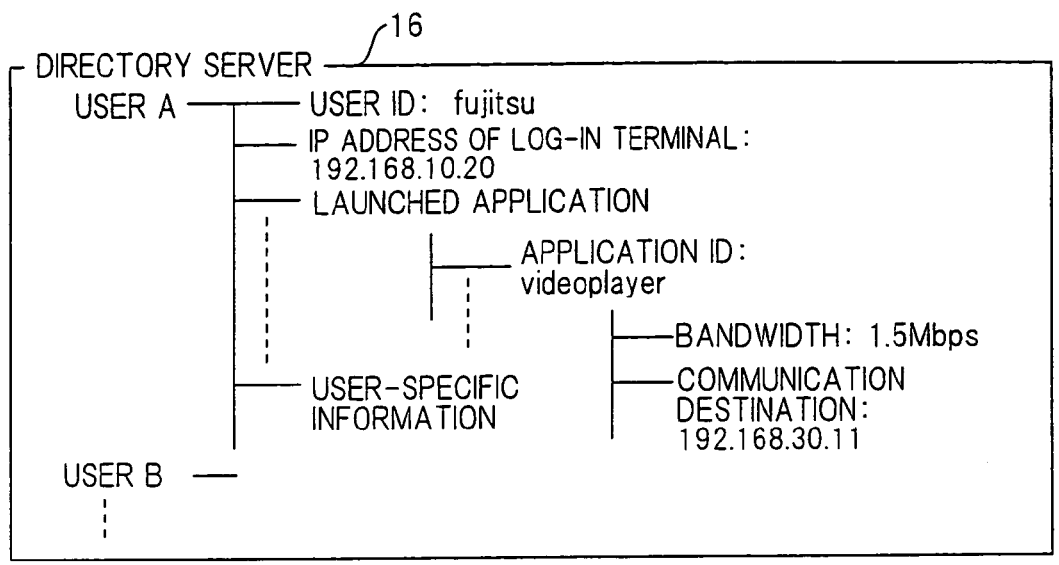
FIG. 17 is a diagram showing another example of information that has been stored in a directory server.

The fourth embodiment relates to a case where the bandwidth required by an application is registered beforehand in the application information field of the directory server 16, as shown in FIG. 15A, the bandwidth required by the application is obtained from this registered data and is reported to the configuration server. However, it is not necessary to register the required bandwidth in advance. For example, an arrangement may be adopted in which when an application is launched, the required bandwidth is registered in the user information field upon being sent to the directory server 16 along with the application identifier and IP address of the destination with which the application communicates. FIG. 17 illustrates an example of the database structure in directory server 16 in such case. With this data structure, the configuration server 18 is capable of querying the directory server 16 in regard to required bandwidth using a combination of both the user identifier and application identifier as a key.

Further, though the foregoing relates to a case in which bandwidth is controlled, control of packet discard rate and control of delay can be executed in the same manner. Further, an arrangement can be adopted in which two or more types of control such as control of bandwidth, control of discard rate and control of data, inclusive of control of priority, can be performed simultaneously.

Further, the foregoing relates to a case in which bandwidth required by an application is set in advance and the bandwidth of a router is controlled, in response to launching of the application, based upon the bandwidth required by this application. However, an arrangement can be adopted in which required bandwidth is set for every user in advance and bandwidth is controlled, in response to launching of an application, based upon the bandwidth required by the user.

Further, the foregoing relates to a case where bandwidth, discard rate and delay are controlled by launching an application. However, an arrangement can be adopted in which bandwidth, discard rate and delay are controlled by generating a log-in event.

Figure 18:
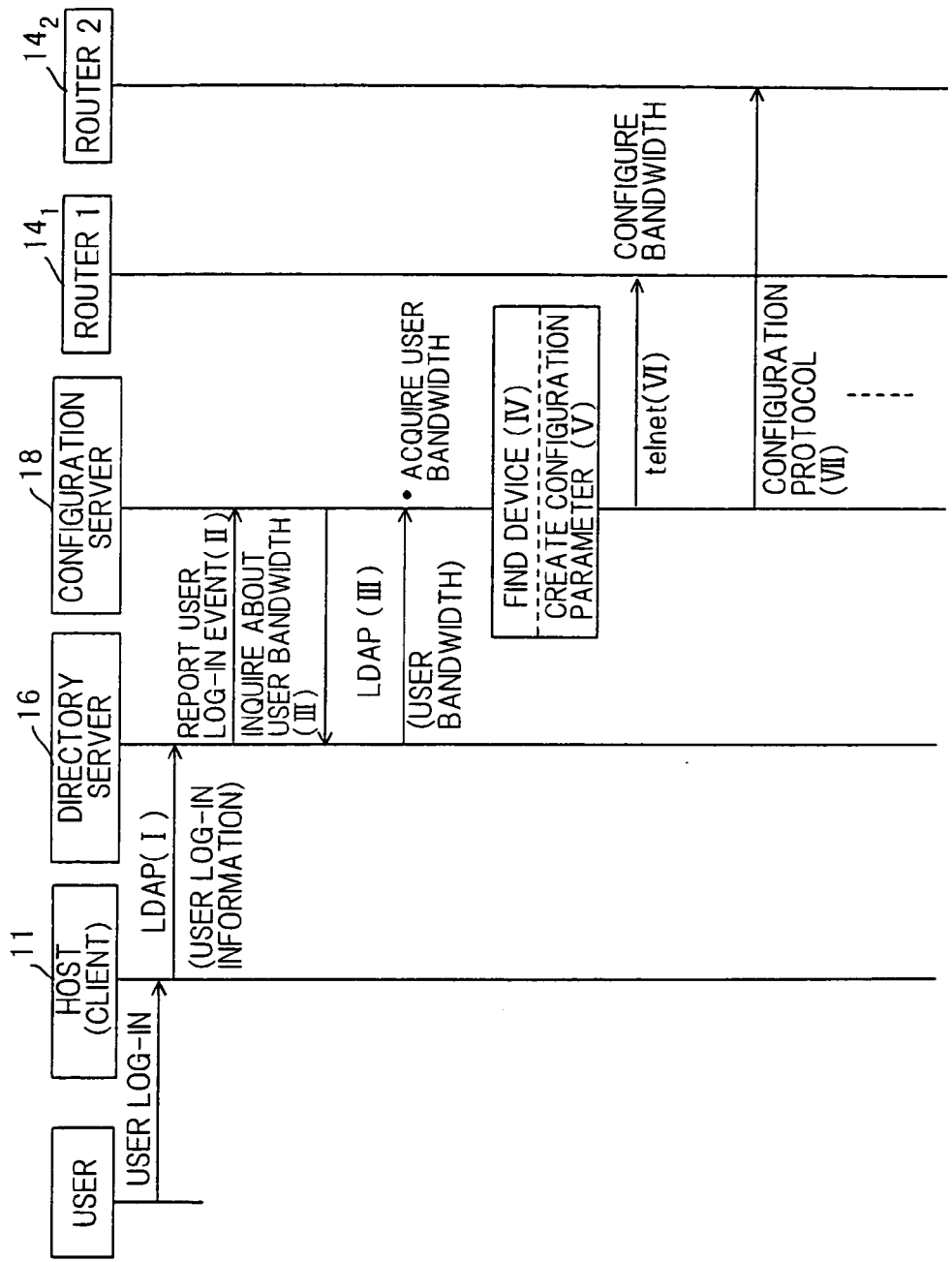
FIG. 18 is a diagram useful in describing a bandwidth control sequence based upon occurrence of a log-in event.
Figure 19A:
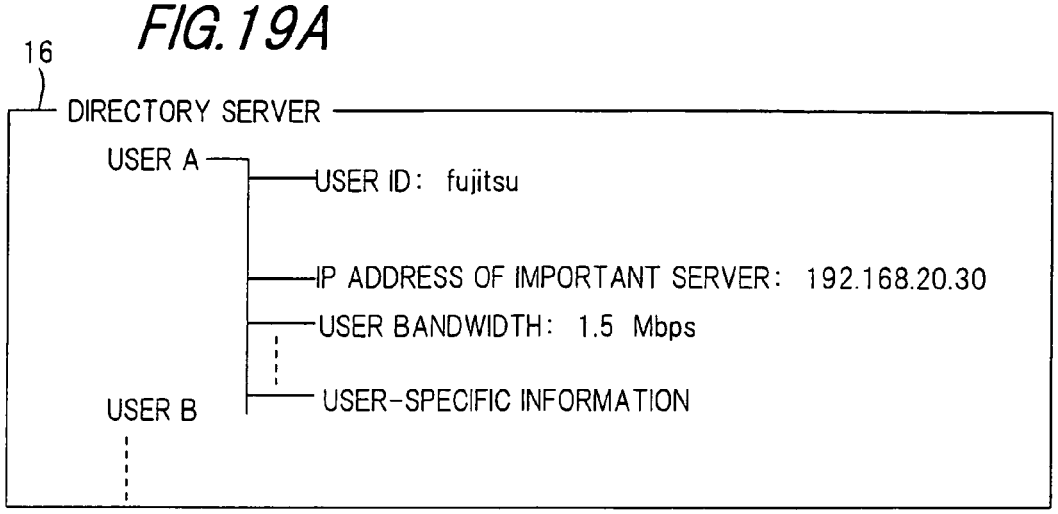
FIGS. 19A and 19B are diagrams showing an example of information that has been stored in a directory server for when bandwidth control based upon a log-in event is performed.
Figure 19B:
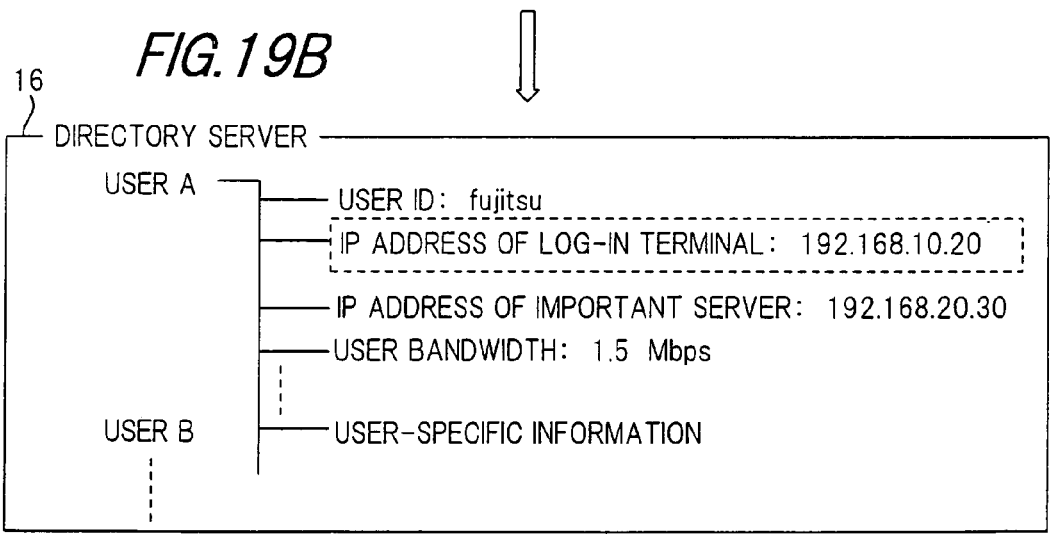
Figure 20:
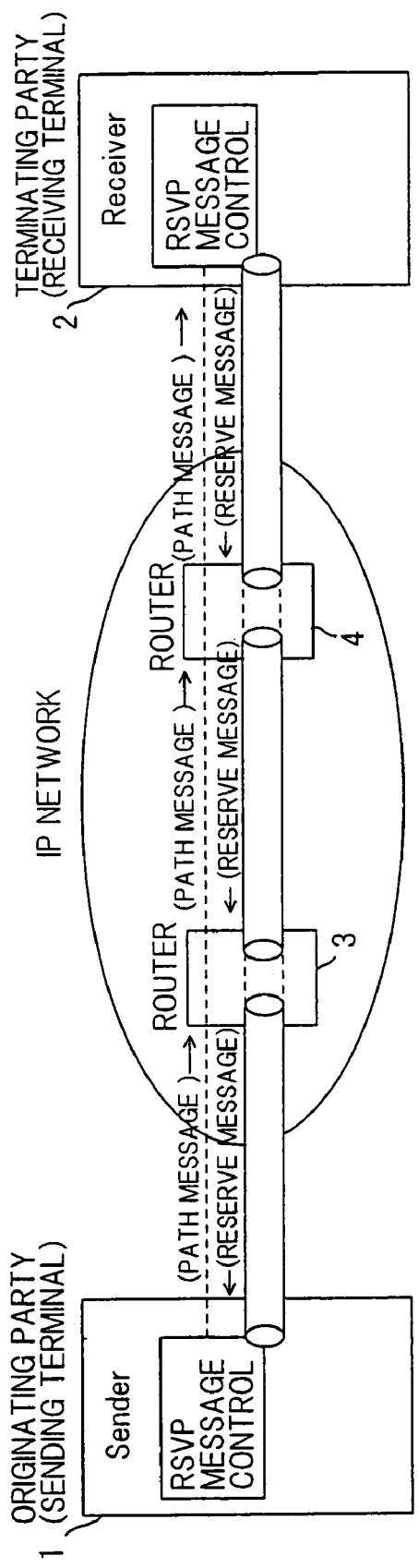
FIG. 20 is a diagram useful in describing RSVP control.

FIG. 18 is a diagram useful in describing a sequence in a case where allocation of bandwidth to a router on a communication path is performed based upon bandwidth required by a user at occurrence of a log-in event, and FIGS. 19A, 19B are diagrams showing the structure of the directory server 16. As shown in FIG. 19A, a bandwidth (1.5 Mbps) required by a user and the IP address of an important server communicated with in dedicated fashion by the user have been registered in association with a user identifier.

I. When the user having the user identifier "fujitsu" logs in to the communication terminal (client) 11 having the IP address 192.169.10.20 (=IPc), the client 11 sends the directory server 16 an LDAP message for updating the information concerning the user identifier "fujitsu". The LDAP message contains the user identifier "fujitsu" and the IP address of the client. The directory server 16 registers the IP address of the client in association with the user identifier "fujitsu" in the database (see FIG. 19B).

II. The event notifier 17 within the directory server 16 detects log-in and notifies the configuration server 18 of the fact that a user having the user identifier "fujitsu" has logged in to the client 11 having the IP address IPc.

III. The configuration server 18 queries the directory server in regard to the required user bandwidth by LDAP using the user identifier "fujitsu" as the key and obtains, as a response, the fact that the address of the server 12 is 192.168.20.30 (=IPa) and that the required bandwidth is 1.5 Mbps.

IV. Next, on the basis of OSPF information, the configuration server 18 finds a router that relays the communication between the client 11 and the server 12. Assume that the IP address of the one router 14₁ is "192.168.15.1 (=IPr)".

V. The configuration server 18 obtains router information (state and information relating to the configuration items) concerning the router 14₁. As a result, the router 14₁ can be configured using Telnet and the configuration server 18 can ascertain that this router is capable of having its bandwidth configured.

VI. The configuration server 18 performs Telnet communication with respect to the router 14₁ of IP address IPr and performs configuring to allocate the bandwidth of 1.5 Mbps for communication for which the IP address on the originating side is IPc and the IP address at the destination is IPa.

VII. The above-described allocating of bandwidth is performed for other routers as well.

The foregoing is for a case where bandwidth is controlled. However, control of packet discard rate and control of delay can be performed in similar fashion. Further, an arrangement can be adopted in which two or more types of control such as control of bandwidth, control of discard rate and control of data, inclusive of control of priority, can be performed simultaneously.

Thus, in accordance with the present invention, a network device is found on a communication path connecting a communication terminal employed by a user and a server that is the destination with which this terminal communicates, and priority is controlled by configuring priority information, which conforms to the priority of the user, for this network device. As a result, control of priority can be performed dynamically, without using a specific protocol such as RSVP, even if there is a change in a terminal employed by a user or a change in network configuration due to the addition of a network device.

Further, in accordance with the present invention, communication can be performed between a terminal employed by a user and a server, with which this terminal communicates, at a priority set for the user in advance. As a result, by setting a priority that takes the post of an employee and organization, etc., into account in an enterprise network, it is possible to perform communication based upon priority control commensurate with the set priority.

Further, in accordance with the present invention, there is provided a database for storing, in association with a user identifier, user information that includes the address of a server that is the destination of communication and the user priority. An event notification device acquires user priority and the server address from the database and reports these to a network-device controller. As a result, the user, merely by entering the user identifier from a prescribed communication terminal and logging in, establishes a communication path between this communication terminal and the server with which the user wishes to communicate. Communication between the terminal employed by the user and the server can be performed at the priority set for the user beforehand.

Further, in accordance with the present invention, when an application is launched after user log-in, the priority control mentioned above is carried out. As a result, the configuring of priority control necessary for the user in a network can be performed at a time when priority control is required and with respect to a device that requires control of priority.

Further, in accordance with the present invention, a network device is found on a communication path connecting a communication terminal employed by a user and a server that is the destination with which this terminal communicates, and priority is controlled by configuring priority information, which conforms to the priority of an application that has been launched, for this network device. As a result, control of priority can be performed dynamically, without using a specific protocol such as RSVP, even if there is a change in a terminal employed by a user or a change in network configuration due to the addition of a network device.

Further, in accordance with the present invention, communication can be performed between a terminal employed by a user and a server, with which this terminal communicates, at a priority set for an application in advance. As a result, by configuring priorities for various applications in an enterprise network upon taking into account the urgency and importance of these applications, it is possible to perform communication based upon control of priority commensurate with the set priority.

Further, in accordance with the present invention, an event notification device acquires the priority of an application, the address of a server that is the destination of communication and the address of the communicating terminal from a database based upon the application identifier and reports these to a network-device controller. As a result, the user, merely by entering a user identifier from a prescribed communication terminal, logging in and launching a prescribed application, establishes a communication path between this communication terminal and the server that conforms to the application. Communication between the terminal employed by the user and the server can be performed at the priority set for the application beforehand.

Further, in accordance with the present invention, control of quality (bandwidth control, discard-rate control and delay control) can be performed dynamically without using a specific protocol even if there is a change in a terminal employed by a user or a change in network configuration due to the addition of a network device. In addition, communication can be performed between a terminal employed by a user and a server, which is the destination of communication, at a quality set for the user or application in advance.

As many apparently widely different embodiments of the present invention can be made without departing from the spirit and scope thereof, it is to be understood that the invention is not limited to the specific embodiments thereof except as defined in the appended claims.

What is claimed is:

1. A network-device control system for performing priority control of a network device constituting a network based upon priority of a user, said system comprising:
   an event notification device for detecting that a user has logged in to a communication terminal or that a user has launched a predetermined application from a communication terminal, and reporting an identifier of the user and the fact that an event has occurred; and
   a network-device controller for performing priority control of a network device based upon information reported by said event notification device; wherein
   said network-device controller acquires priority of the user indicated by the user identifier reported by said event notification device, obtains a network device on a communication path between said communication terminal and an apparatus that is the destination of communication, generates information necessary to perform priority control in accordance with the user priority, and sets this priority control information in said obtained network device.

2. The system according to claim 1, further comprising a database unit for storing, in association with a user identifier, user information that includes the address of the apparatus that is the destination of communication and the user priority; wherein
   said event notification device acquires the priority of the user and the address of the apparatus that is the destination of communication from said database unit and reports these to said network-device controller.

3. The system according to claim 2, wherein
   when a user has logged in by inputting the user identifier, the communication terminal sends this user identifier and the address of the communication terminal to said database unit;
   said database unit stores the address of the communication terminal in association with the user identifier; and said event notification device detects log-in by a change in user information in said database unit, acquires the priority of the user, the address of the apparatus that is the destination of communication and the address of the communication terminal from said database unit, and reports these to said network-device controller.

4. The system according to claim 2, wherein
when the user has launched a predetermined application, the communication terminal sends the user identifier, the address of the communication terminal and an application identifier of the application to said database unit;
said database unit stores the address of the communication terminal, the application identifier and the address of an apparatus that is the destination of communication of the application in association with the user identifier; and
said event notification device detects an application-launch event by a change in application information in said database unit, acquires the priority of the user, the address of the apparatus that is the destination of communication and the address of the communication terminal from said database unit, and reports these to said network-device controller.

5. The system according to claim 1, wherein said event notification device includes:
an event detector for detecting that a user has logged in to a communication terminal or that a user has launched an application from a communication terminal; and
an event notifier for notifying said network-device controller of the fact that the event occurred and of the user identifier; and
said network-device controller includes:
an event receiver for receiving notification from said event notifier;
a priority acquisition unit for acquiring the priority of the user indicated by the received user identifier;
a device selector for selecting a network device which is subjected to priority control based upon the priority of the user;
a device-specific information acquisition unit for acquiring state of configuration of the selected network device and a method of configuring the device;
a configuration information generator for generating priority-control configuration information for performing priority control of each network device based upon the acquired device-specific information and user priority; and
configuration information transmitter for transmitting the priority-control configuration information, which has been generated by said configuration information generator, to the selected network device to thereby set this information in this network device.

6. The system according to claim 2, wherein a directory server is provided, said directory server being provided with said event notification device and said database unit.

7. A network-device control apparatus for performing priority control of a network device constituting a network based upon priority of a user, said apparatus comprising:
an event receiver for receiving an identifier of a user from an event notifier when the user has logged in to a communication terminal or when the user has launched an application;
means for acquiring priority of the user, which is indicated by the reported user identifier, and the address of an apparatus that is the destination of communication by said communication terminal;

a device selector for selecting network devices on a path along which the communication terminal and the apparatus that is the destination of communication communicate;
a generating unit for generating information necessary to perform priority control in accordance with the user priority; and
means for configuring the network device with the information that has been generated by said generating unit.

8. A network-device control system for performing priority control of a network device constituting a network based upon priority of an application, said system comprising:
an event notification device for detecting that a user has launched a predetermined application from a communication terminal, and reporting an identifier of the application and the fact that an application-launch event has occurred; and
a network-device controller for performing priority control of a network device based upon information reported by said event notification device; wherein
said network-device controller acquires priority of the application indicated by the application identifier reported by said event notification device, obtains network devices on a communication path between said communication terminal and an apparatus that is the destination of communication, generates information necessary to control said network devices in accordance with the application priority, and configures each of said network device with this priority control information.

9. The system according to claim 8, further comprising a database unit for storing user information in association with a user identifier, and application information, which includes the application priority, in association with an application identifier; wherein
said event notification device acquires the priority of the application from said database unit and reports this application priority to said network-device controller.

10. The system according to claim 9, wherein
when the user has launched a predetermined application, the communication terminal sends the application identifier and the address of the apparatus that is the destination of communication to said database unit and said database unit stores the application identifier and the address of the apparatus, which is the destination of communication, in association with the user identifier; and
said event notification device detects occurrence of an application-launch event by a change in the application information in the user information in said database unit, acquires the priority of the application, the address of the apparatus that is the destination of communication and the address of the communication terminal from said database unit, and reports these to said network-device controller.

11. The system according to claim 8, wherein said event notification device includes:
an event detector for detecting that a communication terminal has given rise to an application-launch event; and
an event notifier for notifying said network-device controller of the fact that the event occurred and of the application identifier; and said network-device controller includes:

an event receiver for receiving notification from said event notifier;

a priority acquisition unit for acquiring the priority of the application indicated by the received application identifier;

a device selector for selecting a network device which is subjected to priority control based upon the priority of the application;

a device-specific information acquisition unit for acquiring state of configuration of the selected network device and a method of configuring the device;

a configuration information generator for generating priority-control configuration information for performing priority control of the selected network device based upon the acquired device-specific information and application priority; and configuration information transmitter for transmitting the priority-control configuration information, which has been generated by said configuration information generator, to the selected network device to thereby set this information in this network device.

12. The system according to claim 9, wherein a directory server is provided, said directory server being provided with said event notification device and said database unit.

13. A network-device control apparatus for performing priority control of a network device constituting a network based upon priority of an application, said apparatus comprising:

an event receiver for receiving an identifier of an application from an event notification device when a user has launched an application at a communication terminal;

means for acquiring priority of the application, which is indicated by the notified application identifier, and the address of an apparatus that is the destination of communication by said communication terminal based upon the application;

a device selector for selecting network devices on a path along which the communication terminal and the apparatus that is the destination of communication communicate;

a generating unit for generating information necessary to perform priority control in accordance with the application priority; and means for configuring the network device with the information that has been generated by said generating unit.

14. A network-device control system for controlling any one of bandwidth, discard rate and delay of a network device constituting a network, said system comprising:

an event notification device for detecting that a user has logged in to a communication terminal or that a user has launched a predetermined application from a communication terminal, and reporting an identifier of the user and the fact that an event has occurred; and a network-device controller for controlling any one of bandwidth, discard rate and delay of a network device based upon information reported by said event notification device;

said network-device controller:

acquiring any one of a bandwidth value, discard-rate value and delay value conforming to the user identified by the user identifier reported by said event notification device;

obtaining network devices on a communication path between said communication terminal and an apparatus that is the destination of communication;

generating configuration information necessary to control any one of bandwidth, discard rate and delay in accordance with the value acquired; and configuring each of said obtained network devices with this generated configuration information.

15. A network-device control apparatus for controlling any one of bandwidth, discard rate and delay of a network device constituting a network, said apparatus comprising:

an event receiver for receiving at least an identifier of a user from an event notification device when the user has logged in to a communication terminal or when the user has a launched an application;

means for acquiring any one of a bandwidth value, discard-rate value and delay value conforming to a user identified by the notified user identifier, and the address of an apparatus that is the destination of communication by said communication terminal;

a device selector for selecting a network device on a path along which the communication terminal and the apparatus that is the destination of communication communicate;

a generating unit for generating configuration information necessary to control any one of bandwidth, discard rate and delay in accordance with said value acquired; and means for configuring the network device with the configuration information that has been generated by said generating unit.

16. A network-device control system for controlling any one of bandwidth, discard rate and delay of a network device constituting a network, said system comprising:

an event notification device for detecting that a user has launched a predetermined application at a communication terminal, and reporting an identifier of the application and the fact that an application-launch event has occurred; and a network-device controller for controlling any one of bandwidth, discard rate and delay of a network device based upon information reported by said event notification device;

said network-device controller:

acquiring any one of a bandwidth value, discard-rate value and delay value of an application identified by the application identifier reported by said event notification device;

obtaining network devices on a communication path between said communication terminal and an apparatus that is the destination of communication;

generating configuration information necessary to control any one of bandwidth, discard rate and delay in accordance with the value acquired; and configuring each of said obtained network devices with this generated configuration information.

17. A network-device control apparatus for controlling any one of bandwidth, discard rate and delay of a network device constituting a network, said apparatus comprising:

an event receiver for receiving an identifier of an application from an event identification device when a user has a launched an application at a communication terminal;

means for acquiring any one of a bandwidth value, discard-rate value and delay value conforming to an application identified by the reported application identifier, and the address of an apparatus that is the destination of communication by said communication terminal based upon the application;

a device selector for selecting a network device on a path along which the communication terminal and the apparatus that is the destination of communication communicate;

a generating unit for generating configuration information necessary to control any one of bandwidth, discard rate and delay in accordance with the value acquired; and means for configuring the network device with the configuration information that has been generated by said generating unit.

* * * * *